(12) United States Patent
Huang et al.

(10) Patent No.: US 12,494,826 B2
(45) Date of Patent: Dec. 9, 2025

(54) DECODING METHOD, DEVICE, AND READABLE STORAGE MEDIUM

(71) Applicant: VIVO MOBILE COMMUNICATION CO., LTD., Guangdong (CN)

(72) Inventors: Wei Huang, Guangdong (CN); Dajie Jiang, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/744,230

(22) Filed: Jun. 14, 2024

(65) Prior Publication Data
US 2024/0340047 A1 Oct. 10, 2024

Related U.S. Application Data

(63) Continuation of application No. PCT/CN2022/141969, filed on Dec. 26, 2022.

(30) Foreign Application Priority Data

Dec. 30, 2021 (CN) .......................... 202111658371.5

(51) Int. Cl.
*H04B 7/04* (2017.01)
*H04B 7/0456* (2017.01)
*H04L 1/06* (2006.01)
*H04L 5/00* (2006.01)

(52) U.S. Cl.
CPC ......... *H04B 7/0465* (2013.01); *H04L 1/0612* (2013.01); *H04L 5/0003* (2013.01)

(58) Field of Classification Search
CPC ... H04B 7/0465; H04B 7/0669; H04L 1/0612; H04L 5/0003; H04L 1/0047; H04L 1/0631; H04L 1/0668; H04L 5/00; H04N 19/42; H04N 19/44
USPC .................................. 375/262, 265, 340–341
See application file for complete search history.

(56) References Cited

U.S. PATENT DOCUMENTS

| | | | |
|---|---|---|---|
| 7,773,699 B2* | 8/2010 | Jia ........................ | H04L 25/0226 375/279 |
| 9,716,568 B2 | 7/2017 | Akutagawa et al. | |
| 2008/0123618 A1* | 5/2008 | Papadopoulos ....... | H04L 1/0625 370/345 |
| 2009/0316830 A1* | 12/2009 | Rohling ................ | H04L 1/0612 375/300 |
| 2016/0233984 A1 | 8/2016 | Akutagawa et al. | |
| 2024/0372650 A1* | 11/2024 | Huang .................. | H04L 1/0668 |

(Continued)

OTHER PUBLICATIONS

Extended European Search Report for Application No. 22914678.2, dated Mar. 17, 2025, 8 Pages.

(Continued)

Primary Examiner — Emmanuel Bayard
(74) Attorney, Agent, or Firm — Perilla Knox & Hildebrandt LLP; Kenneth A. Knox

(57) ABSTRACT

A decoding method, a device, and a readable storage medium. The method includes: determining, by a decoder, an encoding coefficient vector based on a received signal and an NSTBC codebook; and decoding, by the decoder, original encoded input symbols in a current symbol period based on the encoding coefficient vector, a differential space time block code DSTBC encoding mode, and the NSTBC codebook.

20 Claims, 6 Drawing Sheets

---

201

A decoder determines an encoding coefficient vector based on a received signal and an NSTBC codebook

202

The decoder decodes original encoded input symbols in a current symbol period based on the encoding coefficient vector, a DSTBC encoding mode, and the NSTBC codebook

(56) References Cited

U.S. PATENT DOCUMENTS

2024/0388382 A1* 11/2024 Huang ................ H04B 7/0456

OTHER PUBLICATIONS

IEEE "Compensation of Phase Offsets in MIMO Systems Using an Efficient Differential STBC" Emna Ben Slimane, et. al . . . 2015, 5 Pages.

* cited by examiner

DECODING METHOD, DEVICE, AND READABLE STORAGE MEDIUM

CROSS-REFERENCE TO RELATED APPLICATIONS

This application is a continuation of International Application No. PCT/CN2022/141969 filed on Dec. 26, 2022, which claims priority to Chinese Patent Application No. 202111658371.5 filed on Dec. 30, 2021, which are incorporated herein by reference in their entireties.

TECHNICAL FIELD

This application pertains to the field of communications technologies, and specifically relates to a decoding method, a device, and a readable storage medium.

BACKGROUND

Although conventional orthogonal space time block code (OSTBC) coding codebooks including Alamouti codes can achieve a full diversity gain and a full rate, the codebooks are all designed for conventional active radio frequency communication, without considering modulation characteristics and implementation complexity of passive terminals like backscatter communication. In addition, a decoder needs to know channel state information (CSI) between all transmit antennas and receive antennas.

Currently, there is an urgent need for a differential space time block code decoding method that can reduce system implementation complexity without requiring a decoder to know CSI between all transmit antennas and receive antennas.

SUMMARY

Embodiments of this application provide a decoding method, a device, and a readable storage medium.

According to a first aspect, a decoding method is provided and includes: determining, by a decoder, an encoding coefficient vector based on a received signal and an NSTBC codebook; and decoding, by the decoder, original encoded input symbols in a current symbol period based on the encoding coefficient vector, a DSTBC encoding mode, and the NSTBC codebook.

According to a second aspect, a decoding apparatus is provided and includes:
a first determining module, configured to determine, by a decoder, an encoding coefficient vector based on a received signal and an NSTBC codebook; and
a differential decoding module, configured to decode, by the decoder, original encoded input symbols in a current symbol period based on the encoding coefficient vector, a DSTBC encoding mode, and the NSTBC codebook.

According to a third aspect, a decoder is provided. The decoder includes a processor and a memory. The memory stores a program or instructions capable of running on the processor. When the program or instructions are executed by the processor, the steps of the method according to the first aspect are implemented.

According to a fourth aspect, a decoder is provided and includes a processor and a communication interface. The processor is configured to: determine, by the decoder, an encoding coefficient vector based on a received signal and an NSTBC codebook; and decode, by the decoder, original encoded input symbols in a current symbol period based on the encoding coefficient vector, a DSTBC encoding mode, and the NSTBC codebook.

According to a fifth aspect, a readable storage medium is provided. The readable storage medium stores a program or instructions. When the program or instructions are executed by a processor, the steps of the method according to the first aspect are implemented.

According to a sixth aspect, a chip is provided. The chip includes a processor and a communication interface. The communication interface is coupled to the processor. The processor is configured to run a program or instructions to implement the method according to the first aspect.

According to a seventh aspect, a computer program product is provided. The computer program product is stored in a storage medium. The computer program product is executed by at least one processor to implement the steps of the method according to the first aspect.

According to an eighth aspect, a communication device is provided. The communication device is configured to perform the steps of the method according to the first aspect.

BRIEF DESCRIPTION OF DRAWINGS

FIG. 1$b$ is a schematic diagram of Alamouti space time block code diversity transmission;

DETAILED DESCRIPTION

Figure 1A:
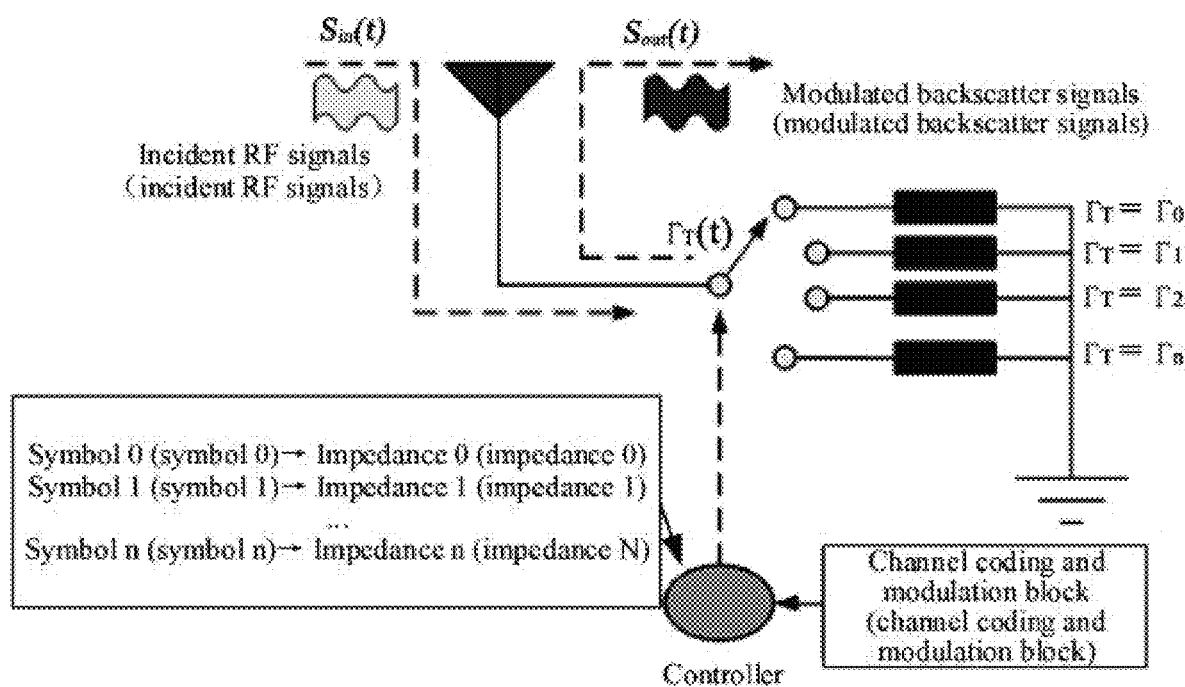
FIG. 1$a$ is a schematic structural diagram of a backscatter communication transmit end.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specified order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, a new radio (NR) system is described for an illustrative purpose, and NR terms are used in most of the following descriptions. These technologies may also be applied to other applications than an NR system application, for example, a 6th Generation (6G) communications system.

In the embodiments of this application, a decoder may be deployed on a receiving device, for example, may be a terminal or a network-side device. The terminal may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR) or virtual reality (VR) device, a robot, a wearable device, vehicle user equipment (VUE), pedestrian user equipment (PUE), a smart home (a home device having a wireless communication function, such as a refrigerator, a television, a washing machine, or furniture), a game console, a personal computer (PC), a teller machine, or a self-service machine. The wearable device includes a smartwatch, a smart band, a smart headphone, smart glasses, smart jewelry (a smart bracelet, a smart wrist chain, a smart ring, a smart necklace, a smart anklet, a smart ankle chain, or the like), a smart wristband, smart clothing, or the like. It should be noted that a specific type of the terminal is not limited in the embodiments of this application. The network-side device may include an access network device or a core network device. The access network device may also be referred to as a radio access network device, a radio access network (RAN), a radio access network function, or a radio access network element. The access network device may include a base station, a wireless local area network (WLAN) access point, a Wireless Fidelity (Wi-Fi) node, or the like. The base station may be referred to as a NodeB, an evolved NodeB (eNB), an access point, a base transceiver station (BTS), a radio base station, a radio transceiver, a basic service set (BSS), an extended service set (ESS), a home NodeB, a home evolved NodeB, a transmission and reception point (TRP), or another appropriate term in the art. As long as the same technical effect is achieved, the base station is not limited to specific technical terms. It should be noted that in the embodiments of this application, only a base station in an NR system is used as an example for description, but a specific type of the base station is not limited. The core network device may include but is not limited to at least one of the following: a core network node, a core network function, a mobility management entity (MME), an access and mobility management function (AMF), a session management function (SMF), a user plane function (UPF), a policy control function (PCF), a policy and charging rules function (PCRF), an edge application server discovery function (EASDF), unified data management (UDM), a unified data repository (UDR), a home subscriber server (HSS), a centralized network configuration (CNC), a network repository function (NRF), a network exposure function (NEF), a local NEF (Local NEF or L-NEF), a binding support function (BSF), an application function (AF), or the like. It should be noted that in the embodiments of this application, only a core network device in the NR system is used as an example for description, but a specific type of the core network device is not limited.

For better understanding the technical solutions of this application, the following content is first described.

A future 6G communications network needs to support the massive Internet of Everything, where a quantity of IoT devices will reach hundreds of billions, and a connection density thereof will be 10-100 times higher than that of 5G, reaching a connection density of 10-100/m². The massive IoT devices pose new challenges in terms of cost and power consumption. Cellular networking, low cost, low power consumption, and even passive zero power consumption are main trends in development of IoT devices in the future. Conventional passive terminals are limited by power consumption and hardware capabilities of the terminals, and communication distances of most of the terminals are less than 10 meters, far from a goal of cellular coverage of 100 meters. Therefore, how to effectively increase communication distances of passive terminals has become a difficulty that needs to be resolved after cellular networking of this technology.

Backscatter communication (BSC) controls an amplitude or a phase of a signal by changing a load impedance. Considering other non-ideal factors in a modulation circuit for backscatter communication, there are more or less errors in an amplitude or a phase of an output signal. However, as long as these signal errors are within a resolvable range, there is no impact on signal demodulation. Therefore, if there are fewer load impedances or fewer types of load impedances to be controlled on each antenna, a tolerable error may be greater, and a probability of error detection is smaller. In addition, due to power consumption and capability limitations of a backscatter communication device (BSC UE), in some cases, waste of power consumption and resources caused by sending pilots is not desired, that is, a decoder is required to complete signal demodulation without knowing CSI information.

Backscatter Communication (BSC):

Backscatter communication means that a backscatter communication device uses a radio frequency signal from another device or in an environment to perform signal modulation to transmit information of the backscatter communication device. A modulation circuit for backscatter communication is shown in FIG. 1a. The backscatter communication device controls a reflection coefficient Γ of the circuit by adjusting an internal impedance of the backscatter communication device, thereby changing an amplitude, a frequency, a phase, or the like of an incident signal to implement signal modulation. The reflection coefficient of the signal may be represented as:

$$\Gamma = \frac{Z_1 - Z_0}{Z_1 + Z_0} = |\Gamma|e^{j\theta_T},$$

where $Z_0$ is an antenna characteristic impedance, $Z_1$ is a load impedance, j represents a complex number, and $\theta_T$ represents a phase. Assuming that the incident signal is $S_{in}(t)$, an output signal is $S_{out}(t)=S_{in}(t)|\Gamma|e^{j\theta_T}$. Therefore, corresponding amplitude modulation, frequency modulation, or phase modulation can be implemented by properly controlling the reflection coefficient. Based on this, the backscatter communication device may be a tag in a conventional radio frequency identification (RFID), or the passive or semi-passive Internet of Things (IoT), which is collectively referred to as BSC UE herein for convenience.

Orthogonal Space Time Block Code (OSTBC)

Space time block codes STBCs are widely applied in cellular communication and wireless local area networks. By introducing signal redundancy in space domain and time domain and properly constructing a block encoding transmission matrix, the STBC achieves a diversity gain and an antenna gain without increasing a bandwidth.

An OSTBC is a special linear STBC, and its linear space time block code S meets the following single condition:

$$S^H S = \Sigma_{i=1}^{M} |s_i|^2 I,$$

where I represents an identity matrix with M dimensions, i represents an $i^{th}$ element in the M dimensions, $s_i$ is a diagonal element, an element in an $i^{th}$ row in S represents a symbol transmitted on an $i^{th}$ transmit antenna within M moments, and an element in a $j^{th}$ column in S represents a symbol transmitted at a $j^{th}$ moment on a $n_t^{th}$ antenna. In the transmission matrix S, columns that meet the foregoing formula are mutually orthogonal, which means that signal sequences transmitted on different antennas are also orthogonal, thereby ensuring that the STBC can achieve a full diversity gain at the same time. A corresponding decoder only needs to perform simple maximum ratio combining (MRC) to sequentially decouple transmitted symbols on different antennas, and perform detection and estimation by using a maximum likelihood detection (ML) algorithm.

Figure 1B:
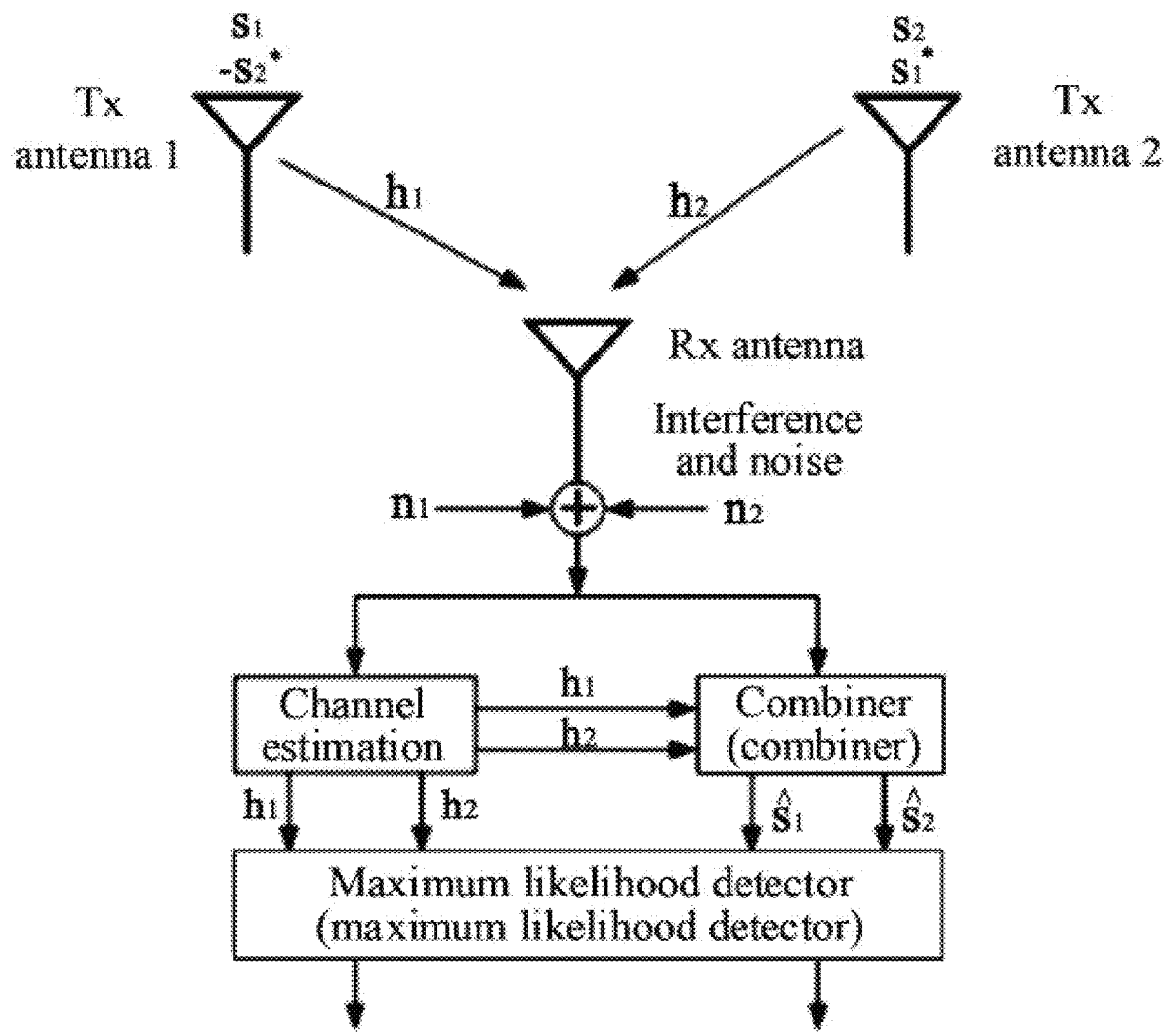

An Alamouti code is a most representative OSTBC code and can achieve a full diversity gain and a full rate gain. FIG. 1b is a principle block diagram of the Alamouti code. In a given symbol period, two symbols are transmitted simultaneously on two antennas. It is assumed that in a current symbol period, a symbol transmitted on antenna 1 is denoted as $s_1$, and that a symbol transmitted on antenna 2 is denoted as $s_2$. In a next symbol period, a symbol transmitted on antenna 1 is $(-s_2^*)$, and a symbol transmitted on antenna 2 is $s_1^*$. In this way, the following space time block code matrix is formed:

$$S = \begin{bmatrix} s_1 & s_2 \\ -s_2^* & s_1^* \end{bmatrix}.$$

Assuming that channels from the two transmit antennas to receive antennas are represented as $h_1$ and $h_2$ respectively and meet time-invariant characteristics in two adjacent symbol periods, that is:

$$h_1(t) = h_1(t+T) = h_1 = \alpha_1 e^{j\theta_1},$$

$$\text{and } h_2(t) = h_2(t+T) = h_2 = \alpha_2 e^{j\theta_1},$$

received signals on the receive antennas in the two symbol periods are:

$$r_1 = r(t) = h_1 s_1 + h_2 s_2 + n_1,$$

$$\text{and } r_2 = r(t+T) = -h_1 s_2^* + h_2 s_1^* + n_2,$$

where $n_1$ and $n_2$ represent received noise and signal interference. The decoder performs combined reception according to the following rules:

$$\hat{s}_1 = h_1^* r_1 + h_2 r_2^*,$$

$$\text{and } \hat{s}_2 = h_2^* r_1 - h_1 r_2^*.$$

The following may be obtained by substituting the received signals $r_1$ and $r_2$:

$$\hat{s}_1 = (\alpha_1^2 + \alpha_2^2) s_1 + h_1^* n_1 + h_2 n_2^*,$$

$$\text{and } \hat{s}_2 = (\alpha_1^2 + \alpha_2^2) s_2 - h_1 n_2^* + h_2^* n_1.$$

Finally, signals $s_1$ and $s_2$ can be estimated by using an ML detector.

In addition to the typical Alamouti block code, a codebook of typical two-antenna OSTBCs is shown in Table 1.

TABLE 1

| S | −S | S* | −S* |
|---|---|---|---|
| $\begin{bmatrix} -s_1 & s_2 \\ s_2^* & s_1^* \end{bmatrix}$ | $\begin{bmatrix} s_1 & -s_2 \\ -s_2^* & -s_1^* \end{bmatrix}$ | $\begin{bmatrix} -s_1^* & s_2^* \\ s_2 & s_1 \end{bmatrix}$ | $\begin{bmatrix} s_1^* & -s_2^* \\ -s_2 & -s_1 \end{bmatrix}$ |
| $\begin{bmatrix} s_1 & -s_2 \\ s_2^* & s_1^* \end{bmatrix}$ | $\begin{bmatrix} -s_1 & s_2 \\ -s_2^* & -s_1^* \end{bmatrix}$ | $\begin{bmatrix} s_1^* & -s_2^* \\ s_2 & s_1 \end{bmatrix}$ | $\begin{bmatrix} -s_1^* & s_2^* \\ -s_2 & -s_1 \end{bmatrix}$ |
| $\begin{bmatrix} s_1 & s_2 \\ s_2^* & -s_1^* \end{bmatrix}$ | $\begin{bmatrix} -s_1 & -s_2 \\ -s_2^* & s_1^* \end{bmatrix}$ | $\begin{bmatrix} s_1^* & s_2^* \\ s_2 & -s_1 \end{bmatrix}$ | $\begin{bmatrix} -s_1^* & -s_2^* \\ -s_2 & s_1 \end{bmatrix}$ |
| $\begin{bmatrix} s_1 & s_2 \\ -s_2^* & s_1^* \end{bmatrix}$ | $\begin{bmatrix} -s_1 & -s_2 \\ s_2^* & -s_1^* \end{bmatrix}$ | $\begin{bmatrix} s_1^* & s_2^* \\ -s_2 & s_1 \end{bmatrix}$ | $\begin{bmatrix} -s_1^* & -s_2^* \\ s_2 & -s_1 \end{bmatrix}$ |

New Space Time Block Code (NSTBC):

In recent years, with deep research on backscatter communication, some researchers put forward a concept of backscatter diversity and design a corresponding space time block codeword. Based on this type of codeword, hardware implementation complexity is reduced, and a probability of error detection is reduced by optimizing a codebook of conventional Alamouti codes.

Two-antenna transmit diversity is used as an example, that is, a codeword matrix S in this case has 2×2 dimensions, and its coding structure is:

$$S_2 = \begin{bmatrix} s_1 & s_2^* \\ s_2 & -s_1^* \end{bmatrix}.$$

According to the foregoing coding structure, it is assumed that in a current symbol period, a symbol transmitted on antenna 1 is denoted as $s_1$, and that a symbol transmitted on antenna 2 is denoted as $s_2^*$. In a next symbol period, a symbol transmitted on antenna 1 is denoted as $s_2$, and a symbol transmitted on antenna 2 is denoted as $(-s_1^*)$. According to a definition of an OSTBC codeword, $S_2$ belongs to the OSTBC codeword, and therefore can achieve a full diversity gain and full rate transmission. The following analyzes differences between this type of codeword and the conventional Alamouti code in backscatter communication.

Assuming that transmission is performed based on a binary phase shift keying (BPSK) modulation symbol, according to a backscatter communication mapping principle, mapping rules for symbols 0 and 1 and reflection coefficients are:

$$\begin{cases} 0 \Leftrightarrow \Gamma_1 = |\Gamma|e^{j\theta} \\ 1 \Leftrightarrow \Gamma_2 = |\Gamma|e^{j(\theta+\pi)} \end{cases}.$$

In other words, the symbols 0 and 1 are represented by controlling two phase-inverted load impedances. Therefore, a coding table for transmitting different symbols simultaneously on two antennas by using a diversity encoding codeword $S_2$ is Table 4. For comparison, Table 2 and Table 3 also provide coding tables for transmitting different symbols simultaneously on two antennas by using an Alamouti codeword and an extended Alamouti codeword. The extended Alamouti codeword is:

$$\begin{bmatrix} s_1 & s_2 \\ s_2^* & -s_1^* \end{bmatrix}.$$

TABLE 2

| 00 | Antenna 1 | Antenna 2 | 01 | Antenna 1 | Antenna 2 |
|---|---|---|---|---|---|
| t | $|\Gamma|e^{j\theta}$ | $|\Gamma|e^{-j\theta}$ | t | $|\Gamma|e^{j\theta}$ | $|\Gamma|e^{-j(\theta+\pi)}$ |
| t + T | $|\Gamma|e^{j\theta}$ | $|\Gamma|e^{-j(\theta+\pi)}$ | t + T | $|\Gamma|e^{j(\theta+\pi)}$ | $|\Gamma|e^{-j(\theta+\pi)}$ |
| 10 | Antenna 1 | Antenna 2 | 11 | Antenna 1 | Antenna 2 |
| t | $|\Gamma|e^{j(\theta+\pi)}$ | $|\Gamma|e^{-j\theta}$ | t | $|\Gamma|e^{j(\theta+\pi)}$ | $|\Gamma|e^{-j(\theta+\pi)}$ |
| t + T | $|\Gamma|e^{j\theta}$ | $|\Gamma|e^{-j\theta}$ | t + T | $|\Gamma|e^{j(\theta+\pi)}$ | $|\Gamma|e^{-j\theta}$ |

TABLE 3

| 00 | Antenna 1 | Antenna 2 | 01 | Antenna 1 | Antenna 2 |
|---|---|---|---|---|---|
| t | $|\Gamma|e^{j\theta}$ | $|\Gamma|e^{j\theta}$ | t | $|\Gamma|e^{j\theta}$ | $|\Gamma|e^{j(\theta+\pi)}$ |
| t + T | $|\Gamma|e^{-j(\theta+\pi)}$ | $|\Gamma|e^{-j\theta}$ | t + T | $|\Gamma|e^{-j\theta}$ | $|\Gamma|e^{-j\theta}$ |
| 10 | Antenna 1 | Antenna 2 | 11 | Antenna 1 | Antenna 2 |
| t | $|\Gamma|e^{j(\theta+\pi)}$ | $|\Gamma|e^{j\theta}$ | t | $|\Gamma|e^{j(\theta+\pi)}$ | $|\Gamma|e^{j(\theta+\pi)}$ |
| t + T | $|\Gamma|e^{-j(\theta+\pi)}$ | $|\Gamma|e^{-j(\theta+\pi)}$ | t + T | $|\Gamma|e^{-j\theta}$ | $|\Gamma|e^{-j(\theta+\pi)}$ |

TABLE 4

| 00 | Antenna 1 | Antenna 2 | 01 | Antenna 1 | Antenna 2 |
|---|---|---|---|---|---|
| t | $|\Gamma|e^{j\theta}$ | $|\Gamma|e^{j\theta}$ | t | $|\Gamma|e^{j\theta}$ | $|\Gamma|e^{j(\theta+\pi)}$ |
| t + T | $|\Gamma|e^{-j\theta}$ | $|\Gamma|e^{-j(\theta+\pi)}$ | t + T | $|\Gamma|e^{-j(\theta+\pi)}$ | $|\Gamma|e^{-j(\theta+\pi)}$ |
| 10 | Antenna 1 | Antenna 2 | 11 | Antenna 1 | Antenna 2 |
| t | $|\Gamma|e^{j(\theta+\pi)}$ | $|\Gamma|e^{j\theta}$ | t | $|\Gamma|e^{j(\theta+\pi)}$ | $|\Gamma|e^{j(\theta+\pi)}$ |
| t + T | $|\Gamma|e^{-j\theta}$ | $|\Gamma|e^{-j\theta}$ | t + T | $|\Gamma|e^{-j(\theta+\pi)}$ | $|\Gamma|e^{-j\theta}$ |

As can be learned according to Table 2, based on the designed NSTBC codebook, antenna 1 requires only two coefficients $|\Gamma|e^{j\theta}$ and $|\Gamma|e^{j(\theta+\pi)}$; and antenna 2 also requires only two coefficients $|\Gamma|e^{-j\theta}$ and $|\Gamma|e^{-j(\theta+\pi)}$, that is, only two types of load impedances are required on each antenna. As can be learned according to Tables 3 and 4, based on the Alamouti codeword and the extended Alamouti codeword, both antenna 1 and antenna 2 require four coefficients $|\Gamma|e^{j\theta}$, $|\Gamma\oplus e^{j(\theta+\pi)}$, $|\Gamma|e^{-j\theta}$, and $|\Gamma\oplus e^{-j(\theta+\pi)}$, that is, four types of load impedances are required on each antenna.

Differential Space Time Block Code (DSTBC):

For the conventional OSTBC and NSTBC, the decoder uses a coherent detection decoding scheme. Therefore, the decoder requires accurate channel state information (CSI) from a transmit antenna to a receive antenna. However, in high-speed movement scenarios or scenarios with fast-changing channel fading conditions, or scenarios in which it is difficult to transmit pilots due to power limitations in backscatter communication, it is difficult for the decoder to perform channel estimation accurately or costs of accurate channel estimation are high. In this case, the decoder cannot obtain accurate CSI information. The differential space time block code is a scheme in which neither the encoder nor the decoder needs to know CSI information, encoding and decoding are simple, and diversity gains can be obtained. The following uses two-antenna transmission and single-antenna reception as examples for description.

At a transmitting encoder, it is assumed that the encoder transmits the following symbols in symbol period 1 and symbol period 2 according to the Alamouti scheme:

$$S = \begin{bmatrix} s_1 & s_2 \\ -s_2^* & s_1^* \end{bmatrix}.$$

Signals $s_1$ and $s_2$ transmitted at the two times do not carry information and are used only as reference signals. Next, the encoder performs transmission in a differential encoding mode. Assuming that in a $(2t-1)^{th}$ symbol period, symbols transmitted on a first antenna and a second antenna are $s_{2t-1}$ and $s_{2t}$ respectively, in a $2t^{th}$ symbol period, symbols transmitted on the first antenna and the second antenna are $-s_{2t}^*$ and $s_{2t-1}^*$ respectively. In a $(2t+1)^{th}$ symbol period, a group of 2m bits arrives at the encoder, and a corresponding coefficient vector $(A(\mathcal{D}_{2t+1}), B(\mathcal{D}_{2t+1}))$ is generated. The encoder calculates, based on symbol vectors transmitted in the previous two symbol periods and the current coefficient vector $(A(\mathcal{D}_{2t+1}), B(\mathcal{D}_{2t+1}))$, symbols transmitted in the current (2t+$_1$)th symbol period:

$$(s_{2t+1}, s_{2t+2}) = A(\mathcal{D}_{2t+1})(s_{2t-1}, s_{2t}) + B(\mathcal{D}_{2t+1})(-s_{2t}^*, s_{2t-1}^*).$$

In addition, based on the Alamouti codebook, transmitted symbols $-s_{2t+2}^*$ and $s_{2t+1}^*$ on the two antennas in a $(2t+_2)^{th}$ symbol period are calculated respectively, where the coefficient vector $(A(\mathcal{D}_{2t+1}), B(\mathcal{D}_{2t+1}))$ meets:

$$A(\mathcal{D}_{2t+1}) = s_{2t+1}s_{2t-1}^* + s_{2t+2}s_{2t}^*,$$

$$\text{and } B(\mathcal{D}_{2t+1}) = -s_{2t+1}s_{2t} + s_{2t+2}s_{2t-1}.$$

According to the foregoing encoding rules, the transmitted symbols are repeatedly encoded.

At a receiving decoder, assuming that signals $r_{2t-1}$, $r_{2t}$, $r_{2t+1}$, and $r_{2t+2}$ are received, and that a channel matrix is defined as:

$$\Lambda(\alpha_1, \alpha_2) = \begin{pmatrix} \alpha_1 & \alpha_2^* \\ \alpha_2 & -\alpha_1^* \end{pmatrix},$$

and that a noise signal is defined as:

$$N_{2t-1} = (\eta_{2t-1}, \eta_{2t}^*),$$

the received signals may be expressed as:

$$(r_{2t-1}, r_{2t}^*) = (s_{2t-1}, s_{2t})\Lambda(\alpha_1, \alpha_2) + N_{2t-1},$$
$$\text{and } (r_{2t+1}, r_{2t+2}^*) = (s_{2t+1}, s_{2t+2})\Lambda(\alpha_1, \alpha_2) + N_{2t+1}.$$

Therefore, $$(r_{2t+1}, r_{2t+2}^*) \cdot (r_{2t-1}, r_{2t}^*) = (s_{2t+1}, s_{2t+2})\Lambda(\alpha_1, \alpha_2)\Lambda^*(\alpha_1, \alpha_2)(s_{2t-1}^*, s_{2t}^*) + $$
$$(s_{2t+1}, s_{2t+2})\Lambda(\alpha_1, \alpha_2)N_{2t-1}^* + N_{2t+1}\Lambda^*(\alpha_1, \alpha_2)(s_{2t-1}^*, s_{2t}^*) + N_{2t+1}N_{2t-1}^*.$$

After combining processing, the following may be obtained:

$$r_{2t+1}r_{2t-1}^* + r_{2t+2}^*r_{2t} = (|\alpha_1|^2 + |\alpha_2|^2)(s_{2t+1}s_{2t-1}^* + s_{2t+2}s_{2t}^*) + $$
$$(s_{2t+1}, s_{2t+2})\Lambda(\alpha_1, \alpha_2)N_{2t-1}^* + N_{2t+1}\Lambda^*(\alpha_1, \alpha_2)(s_{2t-1}^*, s_{2t}^*) + N_{2t+1}N_{2t-1}^*.$$

For simplicity, the following formulas are defined:

$$\mathcal{R}_1 = r_{2t+1}r_{2t-1}^* + r_{2t+2}^*r_{2t},$$

and $\mathcal{N}_1 = $ $$(s_{2t+1}, s_{2t+2})\Lambda(\alpha_1, \alpha_2)N_{2t-1}^* + N_{2t+1}\Lambda^*(\alpha_1, \alpha_2)(s_{2t-1}^*, s_{2t}^*) + N_{2t+1}N_{2t-1}^*.$$

Therefore, the following may be obtained:

$$\mathcal{R}_1 = (|\alpha_1|^2 + |\alpha_2|^2)A(\mathcal{D}_{2t-1}) + \mathcal{N}_1.$$

According to the previous mathematical derivation, $$(s_{2t+1}, s_{2t+2}) = A(\mathcal{D}_{2t+1})(s_{2t-1}, s_{2t}) + B(\mathcal{D}_{2t+1})(-s_{2t}^*, s_{2t-1}^*).$$

Therefore, $$(r_{2t}, -r_{2t-1}^*) = (-s_{2t}^*, s_{2t-1}^*)\Lambda(\alpha_1, \alpha_2) + N_{2t}$$
$$\text{where } N_{2t} = (\eta_{2t}, -\eta_{2t-1}^*).$$

Signals at four moments are processed as follows:

$$(r_{2t+1}, r_{2t+2}^*) \cdot (r_{2t}, -r_{2t-1}^*) = (s_{2t+1}, s_{2t+2})\Lambda(\alpha_1, \alpha_2)\Lambda^*(\alpha_1, \alpha_2)(-s_{2t}, s_{2t-1}) + $$
$$(s_{2t+1}, s_{2t+2})\Lambda(\alpha_1, \alpha_2)N_{2t}^* + N_{2t+1}\Lambda^*(\alpha_1, \alpha_2)(-s_{2t}, s_{2t-1}) + N_{2t+1}N_{2t}^*.$$

After expansion, the following is obtained:

$$r_{2t+1}r_{2t}^* - r_{2t+2}^*r_{2t-1} = (|\alpha_1|^2 + |\alpha_2|^2)(-s_{2t+1}s_{2t}^* + s_{2t+2}s_{2t-1}^*) + $$
$$(s_{2t+1}, s_{2t+2})\Lambda(\alpha_1, \alpha_2)N_{2t}^* + N_{2t+1}\Lambda^*(\alpha_1, \alpha_2)(-s_{2t}, s_{2t-1}) + N_{2t+1}N_{2t}^*.$$

For simplicity, the following formulas are defined:

$$\mathcal{R}_2 = r_{2t+1}r_{2t}^* - r_{2t+2}^*r_{2t-1},$$

and $\mathcal{N}_2 = $ $$(s_{2t+1}, s_{2t+2})\Lambda(\alpha_1, \alpha_2)N_{2t}^* + N_{2t+1}\Lambda^*(\alpha_1, \alpha_2)(-s_{2t}, s_{2t-1}) + N_{2t+1}N_{2t}^*.$$

The following may be obtained:

$$\mathcal{R}_2 = (|\alpha_1|^2 + |\alpha_2|^2)B(\mathcal{D}_{2t-1}) + \mathcal{N}_2.$$

In combination with the previous mathematical derivation, the following is obtained:

$$(\mathcal{R}_1, \mathcal{R}_2) = (|\alpha_1|^2 + |\alpha_2|^2)(A(\mathcal{D}_{2t+1}), B(\mathcal{D}_{2t-1})) + (\mathcal{N}_1, \mathcal{N}_2).$$

Because all coefficient vectors in a coefficient vector set $\mathcal{V}$ are equal in length and $(A(\mathcal{D}_{2t+1}), B(\mathcal{D}_{2t+1}))$ is in a one-to-one correspondence with input symbol information, a receiver selects a coefficient vector $(\tilde{A}(\mathcal{D}_{2t+1}), \tilde{B}(\mathcal{D}_{2t+1}))$ with a shortest Euclidean distance for determining a signal vector $(\mathcal{R}_1, \mathcal{R}_2)$ as a decoding output:

$$(\tilde{A}(\mathcal{D}_{2t+1}), \tilde{B}(\mathcal{D}_{2t+1})) = $$
$$\arg\min_{(A(\mathcal{D}_{2t+1}), B(\mathcal{D}_{2t+1})) \in \mathcal{V}} \|(A(\mathcal{D}_{2t+1}), B(\mathcal{D}_{2t+1})) - (\mathcal{R}_1, \mathcal{R}_2)\|^2.$$

After $(A(\mathcal{D}_{2t+1}), B(\mathcal{D}_{2t+1}))$ is obtained through calculation, it is demapped to original symbols to restore original bits.

Although conventional OSTBC coding codebooks including Alamouti codes can achieve a full diversity gain and a full rate, the codebooks are all designed for conventional active radio frequency communication, without considering modulation characteristics and implementation complexity of passive terminals like backscatter communication. In addition, the decoder needs to know channel state information CSI between all transmit antennas and receive antennas.

Based on the NSTBC codebook proposed for backscatter communication, hardware implementation complexity is reduced, and a probability of error detection is reduced by optimizing the codebook of conventional Alamouti codes. However, this mode requires the decoder to know CSI information between all transmit antennas and receive antennas. Although the conventional Alamouti-based differential space time block code does not require the decoder to know CSI information between all transmit antennas and receive antennas, modulation characteristics and implementation complexity of passive terminals like backscatter communication are not considered.

A decoding method provided in the embodiments of this application is hereinafter described in detail by using some embodiments and application scenarios thereof with reference to the accompanying drawings.

Figure 2:
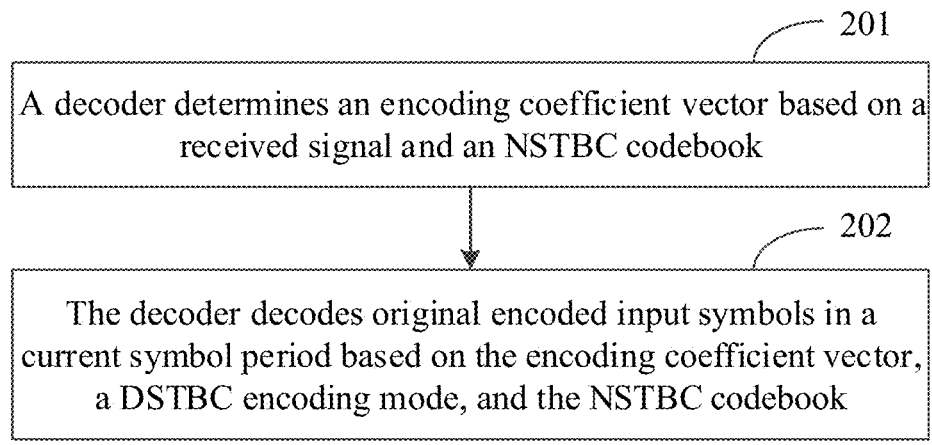
FIG. 2 is a schematic flowchart of a decoding method according to an embodiment of this application.

Referring to FIG. 2, an embodiment of this application provides a decoding method. The method is performed by a decoder. The decoder may be a terminal device or a network-side device. The method includes the following steps.

Step 201: A decoder determines an encoding coefficient vector based on a received signal and an NSTBC codebook.

Step 202: The decoder decodes original encoded input symbols in a current symbol period based on the encoding coefficient vector, a DSTBC encoding mode, and the NSTBC codebook.

In this embodiment of this application, on one hand, based on the received signal and a structure of the NSTBC codebook, a signal vector is constructed, and the encoding coefficient vector is calculated; and on the other hand, the original encoded input symbols in the current symbol period are calculated and restored based on the calculated encoding coefficient vector, the DSTBC encoding mode, and the NSTBC codebook. Based on this decoding mode, original symbols can be restored in absence of a pilot, and system overheads can be reduced. In addition, based on the NSTBC codebook, a quantity or types of load impedances on each antenna can be reduced, and a probability of error detection can be effectively reduced, while a diversity gain is ensured.

The decoding method provided in this embodiment of this application is a new decoding method obtained by combining the DSTBC encoding mode and the NSTBC codebook and extracting advantages of the two. This new decoding method may also be referred to as a differential NSTBC decoding mode.

It should be noted that the signal vector may also be referred to as a statistical signal vector. The original encoded input symbols refer to symbols that have been encoded by an encoder and that have not been subjected to channel gains and/or noise. Different from signals directly received by the decoder, the original encoded input symbols are symbols that need to be obtained by the decoder through decoding.

Before a differential NSTBC decoding scheme is described in detail, a differential NSTBC encoding process is briefly described. The process is as follows:

(1) An encoder calculates, based on encoded symbols transmitted on two antennas in previous two symbol periods, that is, a $(2t-1)^{th}$ symbol period and a $2t^{th}$ symbol period, and an encoding coefficient vector (A($\mathcal{D}_{2t+1}$), B($\mathcal{D}_{2t+1}$)) at a current moment, encoded symbols transmitted on two antennas at the current moment, where the current moment is a $(2t+1)^{th}$ symbol period:

$$(s_{2t+1}, s^*_{2t+2}) = A(\mathcal{D}_{2t+1})(s_{2t-1}, s^*_{2t}) + B(\mathcal{D}_{2t+1})(s_{2t}, -s^*_{2t-1}).$$

(2) In a $(2t+2)^{th}$ symbol period, encoded symbols transmitted on two antennas are $(s_{2t+2}, -s^*_{2t+1})$. In other words, encoded symbols on two transmit antennas in the $(2t+1)^{th}$ symbol period and the $(2t+2)^{th}$ symbol period meet a structure of an NSTBC codebook:

$$\begin{pmatrix} s_{2t+1} & s^*_{2t+2} \\ s_{2t+2} & -s^*_{2t+1} \end{pmatrix},$$

where $s_{2t+1}$ and $s_{2t+2}^*$ are encoded symbols transmitted on two antennas in the $(2t-1)^{th}$ symbol period, and $s_{2t+2}$ and $-s^*_{2t+1}$ are encoded symbols transmitted on two antennas in the $2t^{th}$ symbol period.

(3) An encoding coefficient vector (A($\mathcal{D}_{2t+1}$), B($\mathcal{D}_{2t+1}$)) in the $(2t+1)^{th}$ symbol period meets:

$$A(\mathcal{D}_{2t+1}) = s_{2t+1} s^*_{2t-1} + s^*_{2t+2} s_{2t},$$

$$B(\mathcal{D}_{2t+1}) = s_{2t+1} s^*_{2t} - s^*_{2t+2} s_{2t-1}.$$

(4) Reference symbols transmitted on two antennas in first and second symbol periods are $(s_1, s_2^*)$ and $(s_2, -s_1^*)$, and symbols on two transmit antennas also meet the structure of the NSTBC codebook:

$$\begin{pmatrix} s_1 & s_2^* \\ s_2 & -s_1^* \end{pmatrix}.$$

In a specific implementation, a codebook structure of the NSTBC codebook meets:

$$\begin{pmatrix} s_{2t+1} & s^*_{2t+2} \\ s_{2t+2} & -s^*_{2t+1} \end{pmatrix},$$

where $s_{2t+1}$ and $s_{2t+2}^*$ are transmitted symbols that are on two transmit antennas and that are obtained by the encoder through encoding in the $(2t+1)^{th}$ symbol period (it should be noted that the transmitted symbols may also be referred to as constellation symbols, constellation points, or the like, and the name is not specifically limited in this embodiment of this application), $s_{2t+2}$ and $-s^*_{2t+1}$ are transmitted symbols that are on two transmit antennas and that are obtained by the encoder through encoding in the $(2t+2)^{th}$ symbol period, the symbol $s^*_{2t+2}$ is a conjugate of the symbol $s_{2t+2}$, the symbol $-s^*_{2t+1}$ is a negative conjugate of the symbol $s_{2t+1}$, the $(2t+1)^{th}$ symbol period is the current symbol period, and the $(2t+2)^{th}$ symbol period is a symbol period next to the current symbol period.

In a specific implementation, that a decoder determines an encoding coefficient vector based on a received signal and a new space time block code NSTBC codebook includes:

(1) the decoder determines a signal vector based on the received signal and the NSTBC codebook; and (2) the decoder determines an encoding coefficient vector of the decoder in the current symbol period based on the signal vector.

Specifically, that the decoder determines an encoding coefficient vector of the decoder in the current symbol period based on the signal vector in the foregoing (2) includes:

(2.1) the decoder determines, based on a formula $$(\tilde{A}(\mathcal{D}_{2t+1}), \tilde{B}(\mathcal{D}_{2t+1})) = \arg\min_{(A(\mathcal{D}_{2t+1}), B(\mathcal{D}_{2t+1})) \in \mathcal{V}} \|(A(\mathcal{D}_{2t+1}), B(\mathcal{D}_{2t+1})) - (\mathcal{R}_1, \mathcal{R}_2)\|^2,$$

an encoding coefficient vector $(\tilde{A}(\mathcal{D}_{2t+1}), \tilde{B}(\mathcal{D}_{2t+1}))$ of the decoder in the $(2t+1)^{th}$ symbol period, where $\mathcal{V}$ is an encoding coefficient vector set, $(\mathcal{R}_1, \mathcal{R}_2)$ is the signal vector, and $(\tilde{A}(\mathcal{D}_{2t+1}), \tilde{B}(\mathcal{D}_{2t+1}))$ is the encoding coefficient vector determined by the decoder in the $(2t+1)^{th}$ symbol period.

It should be noted that all coefficient vectors in the coefficient vector set $\mathcal{V}$ are equal in length and that $(A(\mathcal{D}_{2t+1}), B(\mathcal{D}_{2t+1}))$ is in a one-to-one correspondence with input symbols. The decoder selects the encoding coefficient vector $(\tilde{A}(\mathcal{D}_{2t+1}), \tilde{B}(\mathcal{D}_{2t+1}))$ with a shortest Euclidean distance to the signal vector $(\mathcal{R}_1, \mathcal{R}_2)$ as a decision output based on the foregoing formula, which is generally estimated by using a maximum likelihood algorithm.

Specifically, that the decoder decodes original encoded input symbols in a current symbol period based on the encoding coefficient vector of the decoder in the current symbol period, a DSTBC encoding mode, and the NSTBC codebook includes:

the decoder decodes, based on a formula $$(s_{2t+1}, s^*_{2t+2}) = \tilde{A}(\mathcal{D}_{2t+1})(s_{2t-1}, s^*_{2t}) + \tilde{B}(\mathcal{D}_{2t+1})(s_{2t}, -s^*_{2t-1}),$$

original encoded input symbols $(s_{2t+1}, s_{2t+2}^*)$ in the $(2t+1)^{th}$ symbol period, where $s_{2t-1}$ and $s_{2t}^*$ are original encoded input symbols decoded by the decoder in the $(2t-1)^{th}$ symbol period, and $s_{2t}$ and $-s_{2t-1}^*$ are original encoded input symbols decoded by the decoder in the $2t^{th}$ symbol period.

In a specific implementation, the method further includes:
the decoder determines original bits or original symbols based on a preset mapping table between the original bits or the original symbols and $(\tilde{A}(\mathcal{D}_{2t+1}), \tilde{B}(\mathcal{D}_{2t+1}))$, where the preset mapping table includes a mapping relationship between the original bits or the original symbols and the encoding coefficient vector $(\tilde{A}(\mathcal{D}_{2t+1}), \tilde{B}(\mathcal{D}_{2t+1}))$.

In this embodiment of this application, the decoder determines the original bits or the original symbols by directly querying the table. An advantage of this processing is that the original bits or the original symbols are restored and determined by directly querying the mapping table, so that implementation complexity and a decoding delay are both lower.

The original bits or the original symbols refer to initial data bits or initial symbols to be encoded at the encoder, and the initial reference symbols refer to reference symbols on the transmit antennas in an initial symbol period, that is, in a first symbol period. In this embodiment of this application, the decoder performs decoding processing in the foregoing manner, and finally the decoder obtains the initial data bits or the initial symbols.

In a specific implementation, the method further includes:
(1) the decoder determines original symbols $(s_{2t+1}, s_{2t+2})$ based on the decoded original encoded input symbols $(s_{2t+1}, s_{2t+2}^*)$; and (2) the decoder determines original bits based on $(s_{2t+1}, s_{2t+2})$.

In this embodiment of this application, the decoder directly calculates the original bits or the original symbols. An advantage of this processing is that the decoder does not need to store the mapping table, but decodes the original encoded input symbols through real-time calculation.

In a specific implementation, the method further includes:
the decoder determines that original encoded input symbols or initial reference symbols in a first symbol period are $(s_1, s_2^*)$ and that original encoded input symbols in a second symbol period are $(s_2, -s_1^*)$; and the decoder decodes, based on a formula $$(s_3, s_4^*) = \tilde{A}(\mathcal{D}_3)(s_1, s_2^*) + \tilde{B}(\mathcal{D}_3)(s_2, -s_1^*),$$

original encoded input symbols in a third symbol period, where $(\tilde{A}(\mathcal{D}_3), \tilde{B}(\mathcal{D}_3))$ is an encoding coefficient vector obtained by the decoder in the third symbol period, and $(s_1, s_2^*)$ and $(s_2, -s_1^*)$ meet the following NSTBC codebook:

$$\begin{pmatrix} s_1 & s_2^* \\ s_2 & -s_1^* \end{pmatrix}.$$

In this way, the decoder completes decoding processing in the first two symbol periods. The foregoing decoding processing manner in the $(2t+1)^{th}$ symbol period can be used in the third symbol period and subsequent symbol periods.

In a specific implementation, that the decoder determines a signal vector based on the received signal and the NSTBC codebook includes:

the decoder determines, based on formulas $$\mathcal{R}_1 = r_{2t+1} r^*_{2t-1} + r^*_{2t+2} r_{2t}, \text{ and}$$

$$\mathcal{R}_2 = r_{2t+1} r^*_{2t} - r^*_{2t+2} r_{2t-1},$$

the signal vector $(\mathcal{R}_1, \mathcal{R}_2)$, where $r_{2t-1}$ is a signal received by the decoder in the $(2t-1)^{th}$ symbol period, $r_{2t}$ is a signal received by the decoder in the $2t^{th}$ symbol period, $r_{2t+1}$ is a signal received by the decoder in the $(2t+1)^{th}$ symbol period, and $r_{2t+2}$ is a signal received by the decoder in the $(2t+2)^{th}$ symbol period.

For example, in the $(2t-1)^{th}$ symbol period and the $2t^{th}$ symbol period, received signals are:

$$r_{2t-1} = \alpha_1 s_{2t-1} + \alpha_2 s^*_{2t} + \eta_{2t-1}, \text{ and}$$

$$r_{2t} = \alpha_1(s_{2t}) + \alpha_2(-s^*_{2t-1}) + \eta_{2t},$$

where $\alpha_1$ and $\alpha_2$ are respectively channel gains from two transmit antennas of the encoder after encoding to receive antennas of the decoder, $\eta_{2t-1}$ is noise received by the decoder in the $(2t-1)^{th}$ symbol period, and $\eta_{2t}$ is noise received by the decoder in the $2t^{th}$ symbol period.

Specifically, the signal vector ($\mathcal{R}_1$, $\mathcal{R}_2$) meets:

$$\mathcal{R}_1 = \mathcal{S}_1 + \mathcal{N}_1, \text{ and}$$

$$\mathcal{R}_2 = \mathcal{S}_2 + \mathcal{N}_2,$$

where ($\mathcal{S}_1$, $\mathcal{S}_2$) is a linear combination vector of wanted signals, and ($\mathcal{N}_1$, $\mathcal{N}_2$) is a noise interference vector, that is, the signal vector ($\mathcal{R}_1$, $\mathcal{R}_2$) includes two parts: the linear combination vector ($\mathcal{S}_1$, $\mathcal{S}_2$) of wanted signals, and the noise interference vector ($\mathcal{N}_1$, $\mathcal{N}_2$). Specifically, ($\mathcal{S}_1$, $\mathcal{S}_2$) meets:

$$\mathcal{S}_1 = (|\alpha_1|^2 + |\alpha_2|^2)(s_{2t+1}s_{2t-1}^* + s_{2t+2}s_{2t}^*) = (|\alpha_1|^2 + |\alpha_2|^2)A(\mathcal{D}_{2t+1}), \text{ and}$$

$$\mathcal{S}_2 = (|\alpha_1|^2 + |\alpha_2|^2)(s_{2t+1}s_{2t}^* - s_{2t+2}s_{2t-1}^*) = (|\alpha_1|^2 + |\alpha_2|^2)B(\mathcal{D}_{2t+1}); \text{ and}$$

($\mathcal{N}_1$, $\mathcal{N}_2$) meets:

$$\mathcal{N}_1 = (s_{2t+1}, s_{2t+2}^*)\Lambda(\alpha_1, \alpha_2)N_{2t-1}^* + N_{2t+1}\Lambda^*(\alpha_1, \alpha_2)(s_{2t-1}^*, s_{2t}) + N_{2t+1}N_{2t-1}^*,$$

and $$\mathcal{N}_2 = (s_{2t+1}, s_{2t+2}^*)\Lambda(\alpha_1, \alpha_2)M_{2t}^* + N_{2t+1}\Lambda^*(\alpha_1, \alpha_2)(s_{2t}^*, -s_{2t-1}) + N_{2t+1}M_{2t}^*,$$

where $\Lambda(\alpha_1, \alpha_2)$ is a channel matrix, and is represented as:

$$\Lambda(\alpha_1, \alpha_2) = \begin{pmatrix} \alpha_1 & -\alpha_2^* \\ \alpha_2 & \alpha_1^* \end{pmatrix},$$

$N_{2t-1}$, $N_{2t+1}$, and $M_{2t}$ are noise vectors, and are respectively expressed as:

$$N_{2t-1} = (\eta_{2t-1}, \eta_{2t}^*),$$

$$N_{2t+1} = (\eta_{2t+1}, \eta_{2t+2}^*), \text{ and}$$

$$M_{2t} = (\eta_{2t}, -\eta_{2t-1}^*),$$

where $\alpha_1$ and $\alpha_2$ are respectively channel gains from two transmit antennas of the encoder after encoding to receive antennas of the decoder, $s_{2t-1}$ and $s_{2t}^*$ are original encoded input symbols decoded by the decoder in the $(2t-1)^{th}$ symbol period, $s_{2t}$ and $-s_{2t-1}^*$ are original encoded input symbols decoded by the decoder in the $2t^{th}$ symbol period, $s_{2t+1}$ and $s_{2t+2}^*$ are original encoded input symbols decoded by the decoder in the $(2t+1)^{th}$ symbol period, and $s_{2t+2}$ and $-s_{2t+1}^*$ are original encoded input symbols decoded by the decoder in the $(2t+2)^{th}$ symbol period; and $\eta_{2t-1}$ is noise received by the decoder in the $(2t-1)^{th}$ symbol period, $\eta_{2t}$ is noise received by the decoder in the $2t^{th}$ symbol period, $\eta_{2t+1}$ is noise received by the decoder in the $(2t+1)^{th}$ symbol period, and $\eta_{2t+2}$ is noise received by the decoder in the $(2t+2)^{th}$ symbol period.

The foregoing describes the process in which the decoder decodes the original encoded input symbols in the current symbol period. The entire differential NSTBC decoding transmission may be completed by repeating the foregoing process.

The technical solutions in the embodiments of this application are hereinafter described with reference to specific implementations.

In an implementation, two transmit antennas and a single receive antenna are used as an example for description.

(1) Calculate a statistical signal vector ($\mathcal{R}_1$, $\mathcal{R}_2$) based on received signals.

Assuming that signals received by the receive antenna in a $(2t-1)^{th}$ symbol period, a $2t^{th}$ symbol period, a $(2t+1)^{th}$ symbol period, and a $(2t+2)^{th}$ symbol period are $r_{2t-1}$, $r_{2t}$, $r_{2t+1}$, and $r_{2t+2}$ respectively, and that a channel matrix is defined as:

$$\Lambda(\alpha_1, \alpha_2) = \begin{pmatrix} \alpha_1 & -\alpha_2^* \\ \alpha_2 & \alpha_1^* \end{pmatrix},$$

an that a noise vector is:

$$N_{2t-1} = (\eta_{2t-1}, \eta_{2t}^*),$$

vectors of signals received in the $(2t-1)^{th}$ symbol period and the $(2t+1)^{th}$ symbol period are:

$$(r_{2t-1}, r_{2t}^*) = (s_{2t-1}, s_{2t}^*)\Lambda(\alpha_1, \alpha_2) + N_{2t-1}, \text{ and}$$

$$(r_{2t+1}, r_{2t+2}^*) = (s_{2t+1}, s_{2t+2}^*)\Lambda(\alpha_1, \alpha_2) + N_{2t+1}.$$

The vectors of the signals received in the $(2t-1)^{th}$ symbol period and the $(2t+1)^{th}$ symbol period are processed as follows:

$$(r_{2t+1}, r_{2t+2}^*) \cdot (r_{2t-1}, r_{2t}^*) = (s_{2t+1}, s_{2t+2}^*)\Lambda(\alpha_1, \alpha_2)\Lambda^*(\alpha_1, \alpha_2)(s_{2t-1}^*, s_{2t}) +$$

$$(s_{2t+1}, s_{2t+1}^*)\Lambda(\alpha_1, \alpha_2)N_{2t-1}^* + N_{2t+1}\Lambda^*(\alpha_1, \alpha_2)(s_{2t-1}^*, s_{2t}) + N_{2t+1}N_{2t-1}^*.$$

After combining processing, the following is obtained:

$$r_{2t+1}r_{2t-1}^* + r_{2t+2}^*r_{2t} = (|\alpha_1|^2 + |\alpha_2|^2)(s_{2t+1}s_{2t-1}^* + s_{2t+2}s_{2t}^*) +$$

$$(s_{2t+1}, s_{2t+2}^*)\Lambda(\alpha_1, \alpha_2)N_{2t-1}^* + N_{2t+1}\Lambda^*(\alpha_1, \alpha_2)(s_{2t-1}^*, s_{2t}) + N_{2t+1}N_{2t-1}^*.$$

For simplicity, a statistical signal component $\mathcal{R}_1$, a noise interference component $\mathcal{N}_1$, and a wanted signal component $\mathcal{S}_1$ are respectively defined as:

$$\mathcal{R}_1 = r_{2t+1}r_{2t-1}^* + r_{2t+2}^*r_{2t},$$

$$\mathcal{N}_1 = (s_{2t+1}, s_{2t+2}^*)\Lambda(\alpha_1, \alpha_2)N_{2t-1}^* + N_{2t+1}\Lambda^*(\alpha_1, \alpha_2)(s_{2t-1}^*, s_{2t}) + N_{2t+1}N_{2t-1}^*,$$

and $$\mathcal{S}_1 = (|\alpha_1|^2 + |\alpha_2|^2)(s_{2t+1}s_{2t-1}^* + s_{2t+2}s_{2t}^*) = (|\alpha_1|^2 + |\alpha_2|^2)A(\mathcal{D}_{2t+1}).$$

Therefore, the first statistical signal component $\mathcal{R}_1$ can be obtained:

$$\mathcal{R}_1 = \mathcal{S}_1 + \mathcal{N}_1 = (|\alpha_1|^2 + |\alpha_2|^2)A(\mathcal{D}_{2t+1}) + \mathcal{N}_1.$$

Similarly, a received signal vector is defined as:

$$(r_{2t}, -r_{2t-1}^*) = (s_{2t}, -s_{2t-1}^*)\Lambda(\alpha_1, \alpha_2) + M_{2t},$$

where $M_{2t}$ is a noise vector, and is defined as:

$$M_{2t} = (\eta_{2t}, -\eta_{2t-1}^*).$$

Received signal vectors in the $(2t-1)^{th}$ symbol period and the $(2t+1)^{th}$ symbol period are processed as follows:

$$(r_{2t+1}, r_{2t+2}^*) \cdot (r_{2t}, -r_{2t-1}^*) = (s_{2t+1}, s_{2t+2}^*)\Lambda(\alpha_1, \alpha_2)\Lambda^*(\alpha_1, \alpha_2)(s_{2t}^*, -s_{2t-1}) +$$
$$(s_{2t+1}, s_{2t+2}^*)\Lambda(\alpha_1, \alpha_2)M_{2t}^* + N_{2t+1}\Lambda^*(\alpha_1, \alpha_2)(s_{2t}^*, -s_{2t-1}) + N_{2t+1}M_{2t}^*.$$

After combining processing, the following is obtained:

$$r_{2t+1}r_{2t}^* - r_{2t+2}^*r_{2t-1} = (|\alpha_1|^2 + |\alpha_2|^2)(s_{2t+1}s_{2t}^* - s_{2t+2}^*s_{2t-1}) +$$
$$(s_{2t+1}, s_{2t+2}^*)\Lambda(\alpha_1, \alpha_2)M_{2t}^* + N_{2t+1}\Lambda^*(\alpha_1, \alpha_2)(s_{2t}^*, -s_{2t-1}) + N_{2t+1}M_{2t}^*.$$

For simplicity, a statistical signal component $\mathcal{R}_2$, a noise interference component $\mathcal{N}_2$, and a wanted signal component $\mathcal{S}_2$ are respectively defined as:

$$\mathcal{R}_2 = r_{2t+1}r_{2t}^* - r_{2t+2}^*r_{2t-1},$$
$$\mathcal{N}_2 = (s_{2t+1}, s_{2t+2}^*)\Lambda(\alpha_1, \alpha_2)M_{2t}^* + N_{2t+1}\Lambda^*(\alpha_1, \alpha_2)(s_{2t}^*, -s_{2t-1}) + N_{2t+1}M_{2t}^*,$$
and
$$\mathcal{S}_2 = (|\alpha_1|^2 + |\alpha_2|^2)(s_{2t+1}s_{2t}^* - s_{2t+2}^*s_{2t-1}) = (|\alpha_1|^2 + |\alpha_2|^2)B(\mathcal{D}_{2t+1}).$$

Therefore, the second statistical signal component $\mathcal{R}_2$ can be obtained:

$$\mathcal{R}_2 = \mathcal{S}_2 + \mathcal{N}_2 = (|\alpha_1|^2 + |\alpha_2|^2)B(\mathcal{D}_{2t+1}) + \mathcal{N}_2.$$

Therefore, a statistical signal vector of received signals is obtained through calculation:

$$(\mathcal{R}_1, \mathcal{R}_2) = (|\alpha_1|^2 + |\alpha_2|^2)(A(\mathcal{D}_{2t+1}), B(\mathcal{D}_{2t+1})) + (\mathcal{N}_1, \mathcal{N}_2).$$

(2) Calculate an encoding coefficient vector $(\tilde{A}(\mathcal{D}_{2t+1}), \tilde{B}(\mathcal{D}_{2t+1}))$.

After obtaining the statistical signal vector $(\mathcal{R}_1, \mathcal{R}_2)$ of the received signals, a decoder selects an encoding coefficient vector $(\tilde{A}(\mathcal{D}_{2t+1}), \tilde{B}(\mathcal{D}_{2t+1}))$ with a shortest Euclidean distance to the statistical signal vector $(\mathcal{R}_1, \mathcal{R}_2)$ as a decision output:

$$(\tilde{A}(\mathcal{D}_{2t+1}), \tilde{B}(\mathcal{D}_{2t+1})) = \underset{(A(\mathcal{D}_{2t-1}), B(\mathcal{D}_{2t-1})) \in \mathcal{V}}{\arg\min} \|(A(\mathcal{D}_{2t+1}), B(\mathcal{D}_{2t+1})) - (\mathcal{R}_1, \mathcal{R}_2)\|^2.$$

(3) Decode original symbols through calculation.
(a) The decoder first decodes transmitted symbols $(s_3, s_4^*)$ on the two antennas in a third symbol period by using a differential decoding method:

$$(s_3, s_4^*) = \tilde{A}(\mathcal{D}_3)(s_1, s_2^*) + \tilde{B}(\mathcal{D}_3)(s_2, -s_1^*),$$

where $(s_1, s_2^*)$ are transmitted symbols on the two antennas in a first symbol period, and are known symbols, and meet a structure of an NSTBC codebook with transmitted symbols on the two antennas in a second symbol period:

$$\begin{pmatrix} s_1 & s_2^* \\ s_2 & -s_1^* \end{pmatrix}.$$

$(\tilde{A}(\mathcal{D}_3), \tilde{B}(\mathcal{D}_3))$ is an encoding coefficient vector that is obtained through calculation in the third symbol period based on (2).

(b) Assuming that $(s_{2t-1}, s_{2t}^*)$ are decoded original encoded input symbols on the two antennas in the $(2t-1)^{th}$ symbol period, and meet the structure of the NSTBC codebook with decoded original encoded input symbols on the two antennas in the $2t^{th}$ symbol period:

$$\begin{pmatrix} s_{2t-1} & s_{2t}^* \\ s_{2t} & -s_{2t-1}^* \end{pmatrix}.$$

(c) In the $(2t+1)^{th}$ symbol period, after the encoding coefficient vector $(\tilde{A}(\mathcal{D}_{2t+1}), \tilde{B}(\mathcal{D}_{2t+1}))$ in the $(2t+1)^{th}$ symbol period is obtained through calculation in (2), original encoded input symbols $(s_{2t+1}, s_{2t+2}^*)$ on the two transmit antennas in the $(2t+1)^{th}$ symbol period are decoded by using the differential decoding method:

$$(s_{2t+1}, s_{2t+2}^*) = \tilde{A}(\mathcal{D}_{2t+1})(s_{2t-1}, s_{2t}^*) + \tilde{B}(\mathcal{D}_{2t+1})(s_{2t}, -s_{2t-1}^*).$$

After the original encoded input symbols $(s_{2t+1}, s_{2t+2}^*)$ on the two antennas in the $(2t+1)^{th}$ symbol period are decoded, the original input symbols $(s_{2t+1}, s_{2t+2})$ and corresponding input bits can be restored.

(4) Repeat steps (1) to (3) to complete decoding of all received signals.

In this implementation, the decoder does not need to store a mapping table, but decodes an original input signal through real-time calculation.

In another implementation, different from the foregoing implementation in which the corresponding original encoded input symbols $(s_{2t+1}, s_{2t+2}^*)$ are obtained through calculation after the encoding coefficient vector ($\tilde{A}(\mathcal{D}_{2t+1})$, $\tilde{B}(\mathcal{D}_{2t+1})$) is obtained, in the implementation of the present invention, original input symbols are demapped and decoded by querying a mapping table. A specific solution is as follows:

(1) Calculate a statistical signal vector ($\mathcal{R}_1$, $\mathcal{R}_2$) based on received signals. For details, refer to the above embodiment.

(2) Calculate an encoding coefficient vector ($A(\mathcal{D}_{2t+1})$, ($\mathcal{D}_{2t+1}$)). For details, refer to the above embodiment.

(3) By querying a mapping table between the encoding coefficient vector and input symbols or bits, demap and decode the original input symbols or bits.

(4) Repeat steps (1) to (3) to complete decoding of all received signals.

BPSK is used as an example to describe differential NSTBC decoding. Assuming that BPSK modulation is used, a set of constellation points is $\{-1/\sqrt{2}, 1/\sqrt{2}\}$, where $\sqrt{2}$ in the set of constellation points is to ensure normalization processing of transmit power, and a set of encoding coefficient vectors is $\mathcal{V}$. Assuming that two reference modulation signals are $s_1 = s_2 = 1/\sqrt{2}$, and that two input information bits at an input end of an encoder are $c_1$ and $c_2$, the first bit $c_1$ is mapped to a symbol $s_3$, the second bit $c_2$ is mapped to a symbol $s_4$, and the symbols $s_3$ and $s_4$ are both BPSK constellation points. A mapping relationship is:

$$c_1 \to s_3 = \frac{(-1)^{c_1}}{\sqrt{2}}, c_1 = \{0, 1\}, \text{ and}$$

$$c_2 \to s_4 = \frac{(-1)^{c_2}}{\sqrt{2}}, c_2 = \{0, 1\}.$$

According to a definition of an encoding coefficient vector, $$A(\mathcal{D}_3) = s_3 s_1^* + s_4^* s_2, \text{ and}$$

$$B(\mathcal{D}_3) = s_3 s_2^* - s_4^* s_1.$$

Based on different values of the input bits $c_1$ and $c_2$, a mapping table between the input bits and ($A(\mathcal{D}_3)$, $B(\mathcal{D}_3)$) may be obtained:

Mapping table between coefficient vectors and input bits in BPSK modulation

| Input bits ($c_1$, $c_2$) | Encoding coefficient vector (A, B) |
| --- | --- |
| (0, 0) | (1, 0) |
| (1, 0) | (0, −1) |
| (0, 1) | (0, 1) |
| (1, 1) | (−1, 0) |

Because the mapping table is applicable to a coefficient vector ($\tilde{A}$, $\tilde{B}$) in different symbol periods after initial reference symbols are determined, after a coefficient vector ($\tilde{A}(\mathcal{D}_{2t+1})$, $\tilde{B}(\mathcal{D}_{2t+1})$) is obtained through calculation, the input symbols or input bits ($c_1$, $c_2$) can be demapped and obtained by querying the mapping table.

An advantage of this implementation is that the original input symbols are restored by directly querying the mapping table without calculation, so that implementation complexity and a decoding delay are both lower.

The decoding method provided in this embodiment of this application may be performed by a decoding apparatus. A decoding apparatus provided in an embodiment of this application is described by assuming that the decoding apparatus performs the decoding method in this embodiment of this application.

Figure 3:
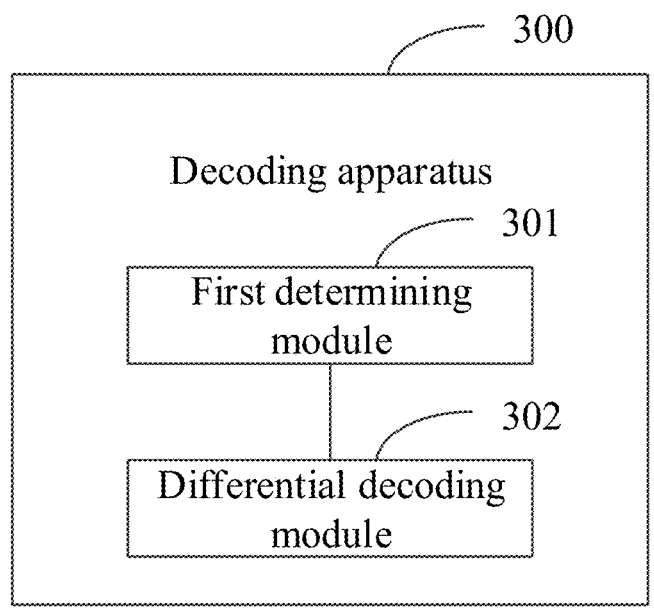
FIG. 3 is a schematic structural diagram of a decoding apparatus according to an embodiment of this application.

Referring to FIG. 3, an embodiment of this application provides a decoding apparatus 300, including:
a first determining module 301, configured to determine, by a decoder, an encoding coefficient vector based on a received signal and an NSTBC codebook; and
a differential decoding module 302, configured to decode, by the decoder, original encoded input symbols in a current symbol period based on the encoding coefficient vector, a DSTBC encoding mode, and the NSTBC codebook.

In this embodiment of this application, on one hand, based on the received signal and a structure of the NSTBC codebook, a signal vector is constructed, and the encoding coefficient vector is calculated; and on the other hand, the original encoded input symbols in the current symbol period are calculated and restored based on the calculated encoding coefficient vector, the DSTBC encoding mode, and the NSTBC codebook. Based on this decoding mode, original symbols can be restored in absence of a pilot, and system overheads can be reduced. In addition, based on the NSTBC codebook, a quantity or types of load impedances on each antenna can be reduced, and a probability of error detection can be effectively reduced, while a diversity gain is ensured.

In a specific implementation, a codebook structure of the NSTBC codebook meets:

$$\begin{pmatrix} s_{2t+1} & s_{2t+2}^* \\ s_{2t+2} & -s_{2t+1}^* \end{pmatrix},$$

where $s_{2t+1}$ and $s_{2t+2}^*$ are original encoded input symbols decoded by the decoder in a $(2t+1)^{th}$ symbol period, $s_{2t+2}$ and $-s_{2t+1}^*$ are original encoded input symbols decoded by the decoder in a $(2t+2)^{th}$ symbol period, the symbol $s_{2t+2}^*$ is a conjugate of the symbol $s_{2t+2}$, the symbol $-s_{2t+1}^*$ is a negative conjugate of the symbol $s_{2t+1}$, the $(2t+1)^{th}$ symbol period is the current symbol period, and the $(2t+2)^{th}$ symbol period is a symbol period next to the current symbol period.

In a specific implementation, the first determining module is specifically configured to:
determine, by the decoder, a signal vector based on the received signal and the NSTBC codebook; and
determine, by the decoder, an encoding coefficient vector of the decoder in the current symbol period based on the signal vector.

In a specific implementation, the first determining module is specifically configured to:
determine, by the decoder based on a formula $$(\tilde{A}(\mathcal{D}_{2t+1}), \tilde{B}(\mathcal{D}_{2t+1})) = \underset{(A(\mathcal{D}_{2t-1}), B(\mathcal{D}_{2t-1})) \in \mathcal{V}}{\arg\min} \|(A(\mathcal{D}_{2t+1}), B(\mathcal{D}_{2t+1})) - (\mathcal{R}_1, \mathcal{R}_2)\|^2,$$

an encoding coefficient vector ($\tilde{A}(\mathcal{D}_{2t+1})$, $\tilde{B}(\mathcal{D}_{2t+1})$) of the decoder in a $(2t+1)^{th}$ symbol period, where $\mathcal{V}$ is an encoding coefficient vector set, ($\mathcal{R}_1$, $\mathcal{R}_2$) is the signal vector, and ($\tilde{A}(\mathcal{D}_{2t+1})$, $\tilde{B}(\mathcal{D}_{2t+1})$) is the encoding coefficient vector determined by the decoder in the $(2t+1)^{th}$ symbol period.

In a specific implementation, the differential decoding module is specifically configured to:

decode, by the decoder based on a formula $$(s_{2t+1}, s_{2t+2}^*) = \tilde{A}(\mathcal{D}_{2t+1})(s_{2t-1}, s_{2t}^*) + \tilde{B}(\mathcal{D}_{2t+1})(s_{2t}, -s_{2t-1}^*),$$

original encoded input symbols in the $(2t+1)^{th}$ symbol period, where $s_{2t-1}$ and $s_{2t}^*$ are original encoded input symbols decoded by the decoder in a $(2t-1)^{th}$ symbol period, and $s_{2t}$ and $-s_{2t-1}$ are original encoded input symbols decoded by the decoder in a $2t^{th}$ symbol period.

In a specific implementation, the apparatus further includes:

a second determining module, configured to determine, by the decoder, original bits or original symbols based on a preset mapping table between the original bits or the original symbols and ($\tilde{A}(\mathcal{D}_{2t+1})$, $\tilde{B}(\mathcal{D}_{2t+1})$), where the preset mapping table between the original bits or the original symbols and ($\tilde{A}(\mathcal{D}_{2t+1})$, $\tilde{B}(\mathcal{D}_{2t+1})$) includes a mapping relationship between the original bits or the original symbols and the encoding coefficient vector ($\tilde{A}(\mathcal{D}_{2t+1})$, $\tilde{B}(\mathcal{D}_{2t+1})$).

In a specific implementation, the apparatus further includes:

a third determining module, configured to determine, by the decoder, original symbols ($s_{2t+1}$, $s_{2t+2}$) based on the decoded original encoded input symbols ($s_{2t+1}$, $s_{2t+2}$); and determine, by the decoder, original bits based on ($s_{2t+1}$, $s_{2t+2}$).

In a specific implementation, the apparatus further includes:

a fourth determining module, configured to determine, by the decoder, that original encoded input symbols in a first symbol period are ($s_1$, $s_2^*$) and that original encoded input symbols in a second symbol period are ($s_2$, $-s_1^*$), where the original encoded input symbols ($s_1$, $s_2^*$) are initial reference symbols; and the differential decoding module is further configured to decode, by the decoder based on a formula $$(s_3, s_4^*) = \tilde{A}(\mathcal{D}_3)(s_1, s_2^*) + \tilde{B}(\mathcal{D}_3)(s_2, -s_1^*),$$

original encoded input symbols in a third symbol period, where ($\tilde{A}(\mathcal{D}_3)$, $\tilde{B}(\mathcal{D}_3)$) is an encoding coefficient vector obtained by the decoder in the third symbol period, and ($s_1$, $s_2^*$) and ($s_2$, $-s_1^*$) meet the following NSTBC codebook:

$$\begin{pmatrix} s_1 & s_2^* \\ s_2 & -s_1^* \end{pmatrix}.$$

In a specific implementation, the first determining module is specifically configured to:

determine, by the decoder based on formulas $$\mathcal{R}_1 = r_{2t+1}r_{2t-1}^* + r_{2t+2}^*r_{2t}, \text{ and}$$

$$\mathcal{R}_2 = r_{2t+1}r_{2t}^* - r_{2t+2}^*r_{2t-1},$$

the signal vector ($\mathcal{R}_1$, $\mathcal{R}_2$), where $r_{2t-1}$ is a signal received by the decoder in a $(2t-1)^{th}$ symbol period, $r_{2t}$ is a signal received by the decoder in a $2t^{th}$ symbol period, $r_{2t+1}$ is a signal received by the decoder in a $(2t+1)^{th}$ symbol period, and $r_{2t+2}$ is a signal received by the decoder in a $(2t+2)^{th}$ symbol period.

In a specific implementation, the signal vector ($\mathcal{R}_1$, $\mathcal{R}_2$) meets:

$$\mathcal{R}_1 = \mathcal{S}_1 + \mathcal{N}_1, \text{ and}$$

$$\mathcal{R}_2 = \mathcal{S}_2 + \mathcal{N}_2,$$

where ($\mathcal{S}_1$, $\mathcal{S}_2$) is a linear combination vector of wanted signals, and ($\mathcal{N}_1$, $\mathcal{N}_2$) is a noise interference vector.

In a specific implementation, ($\mathcal{N}_1$, $\mathcal{N}_2$) meets:

$$\mathcal{S}_1 = (|\alpha_1|^2 + |\alpha_2|^2)(s_{2t+1}s_{2t-1}^* + s_{2t+2}s_{2t}^*) = (|\alpha_1|^2 + |\alpha_2|^2)A(\mathcal{D}_{2t+1}), \text{ and}$$

$$\mathcal{S}_2 = (|\alpha_1|^2 + |\alpha_2|^2)(s_{2t+1}s_{2t}^* - s_{2t+2}^*s_{2t-1}) = (|\alpha_1|^2 + |\alpha_2|^2)B(\mathcal{D}_{2t+1}); \text{ and}$$

($\mathcal{N}_1$, $\mathcal{N}_2$) meets:

$$\mathcal{N}_1 = (s_{2t+1}, s_{2t+2}^*)\Lambda(\alpha_1, \alpha_2)N_{2t-1}^* + N_{2t+1}\Lambda^*(\alpha_1, \alpha_2)(s_{2t-1}^*, s_{2t}) + N_{2t+1}N_{2t-1}^*,$$

and $$\mathcal{N}_2 = (s_{2t+1}, s_{2t+2}^*)\Lambda(\alpha_1, \alpha_2)M_{2t}^* + N_{2t+1}\Lambda^*(\alpha_1, \alpha_2)(s_{2t}^*, -s_{2t-1}) + N_{2t+1}M_{2t}^*,$$

where $\Lambda(\alpha_1, \alpha_2) = \begin{pmatrix} \alpha_1 & -\alpha_2^* \\ \alpha_2 & \alpha_1^* \end{pmatrix}$, $$N_{2t-1} = (\eta_{2t-1}, \eta_{2t}^*),$$

$$N_{2t+1} = (\eta_{2t+1}, \eta_{2t+2}^*), \text{ and}$$

$$M_{2t} = (\eta_{2t}, -\eta_{2t-1}^*),$$

where $\alpha_1$ and $\alpha_2$ are respectively channel gains from two transmit antennas of an encoder after encoding to receive antennas of the decoder, $s_{2t-1}$ and $s_{2t}^*$ are original encoded input symbols decoded by the decoder in the $(2t-1)^{th}$ symbol period, $s_{2t}$ and $-s_{2t-1}^*$ are original encoded input symbols decoded by the decoder in the $2t^{th}$ symbol period, $s_{2t+1}$ and $s_{2t+2}^*$ are original encoded input symbols decoded by the decoder in the $(2t+1)^{th}$ symbol period, and $s_{2t+2}$ and $-s_{2t+1}^*$ are original encoded input symbols decoded by the decoder in the $(2t+2)^{th}$ symbol period;

$\Lambda(\alpha_1, \alpha_2)$ is a channel matrix;

$N_{2t-1}$, $N_{2t+1}$, and $M_{2t}$ are noise vectors; and $\eta_{2t-1}$ is noise received by the decoder in the $(2t-1)^{th}$ symbol period, $\eta_{2t}$ is noise received by the decoder in the $2t^{th}$ symbol period, $\eta_{2t+1}$ is noise received by the decoder in the $(2t+1)^{th}$ symbol period, and $\eta_{2t+2}$ is noise received by the decoder in the $(2t+2)^{th}$ symbol period.

The decoding apparatus in this embodiment of this application may be an electronic device, for example, an electronic device with an operating system, or may be a component in an electronic device, for example, an integrated circuit or a chip. The electronic device may be a terminal, or may be other devices than a terminal. For example, the terminal may include but is not limited to the foregoing illustrated type of the terminal 11. The other devices may be a server, a network attached storage (NAS), and the like. This is not specifically limited in this embodiment of this application.

The decoding apparatus provided in this embodiment of this application can implement each process implemented by the method embodiment in FIG. 2, with the same technical effect achieved. To avoid repetition, details are not described herein again.

Figure 4:
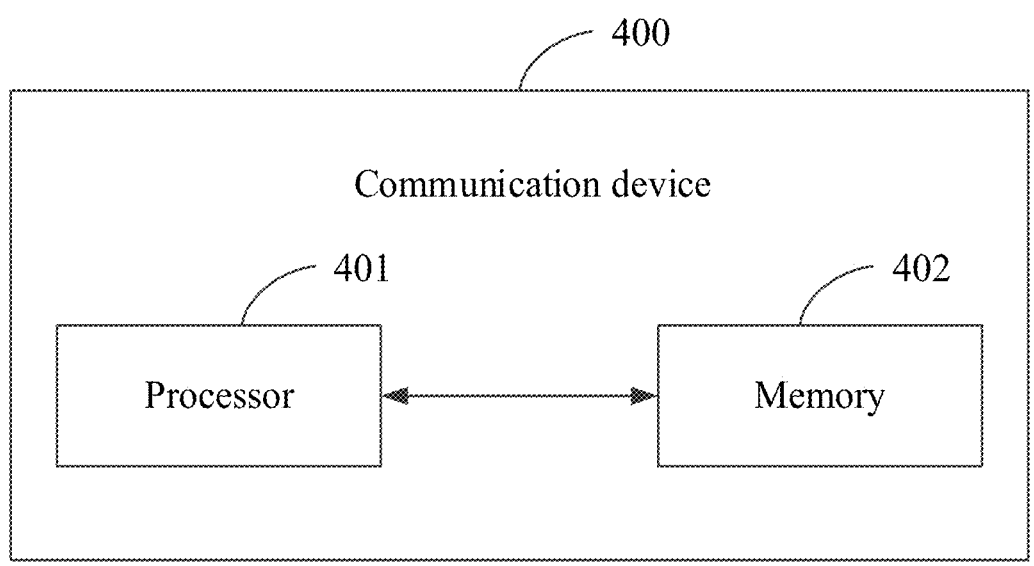
FIG. 4 is a schematic structural diagram of a communication device according to an embodiment of this application.

Optionally, as shown in FIG. 4, an embodiment of this application further provides a communication device 400, including a processor 401 and a memory 402. The memory 402 stores a program or instructions capable of running on the processor 401. For example, when the communication device 400 is a terminal, and the program or instructions are executed by the processor 401, each step of the foregoing embodiment of the decoding method is implemented, with the same technical effect achieved. When the communication device 400 is a network-side device, and the program or instructions are executed by the processor 401, each step of the foregoing embodiment of the decoding method is implemented, with the same technical effect achieved. To avoid repetition, details are not described herein again.

An embodiment of this application further provides a decoder, including a processor and a communication interface. The processor is configured to: determine, by the decoder, an encoding coefficient vector based on a received signal and an NSTBC codebook; and decode, by the decoder, original encoded input symbols in a current symbol period based on the encoding coefficient vector, a DSTBC encoding mode, and the NSTBC codebook.

Figure 5:
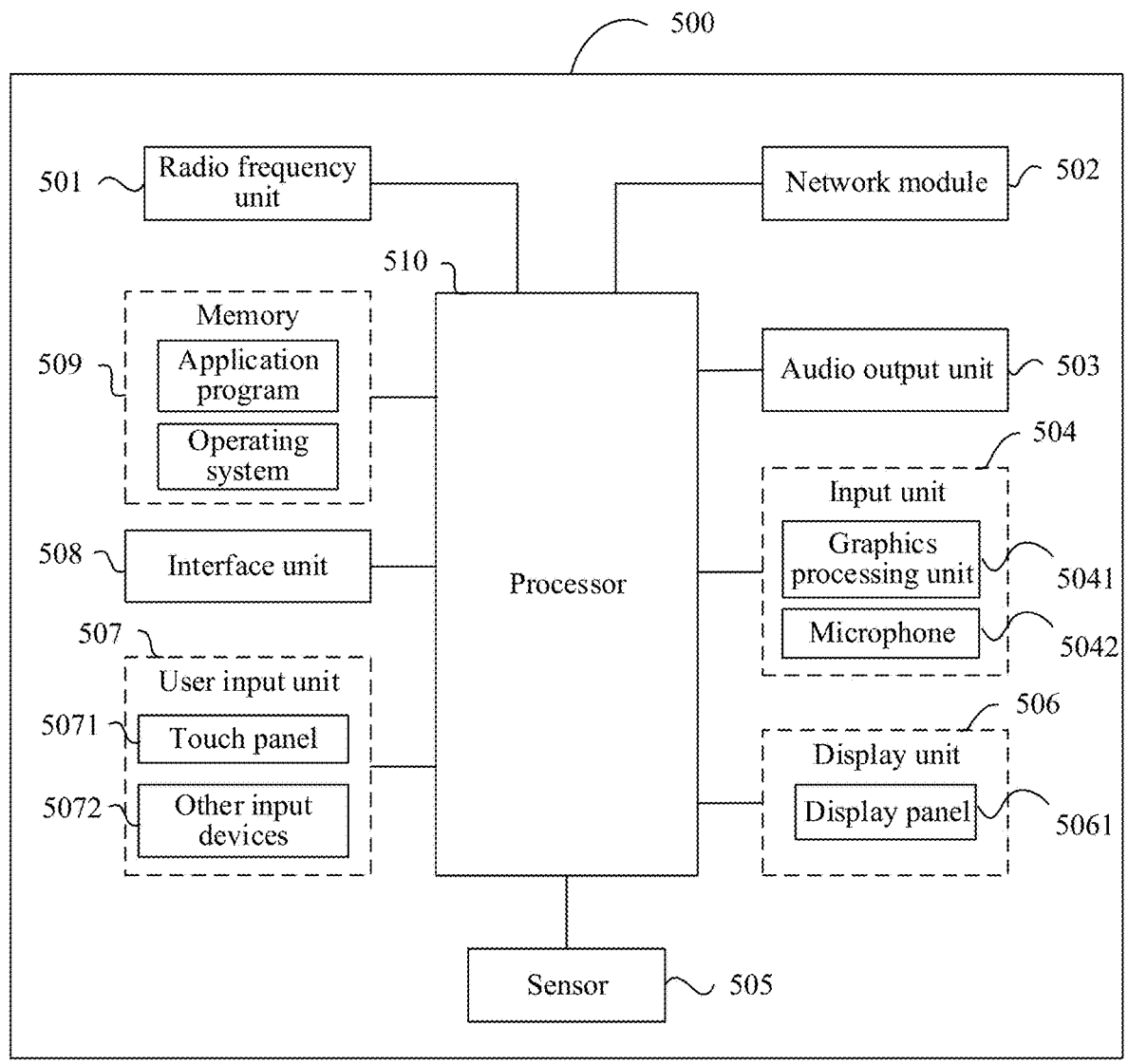
FIG. 5 is a schematic structural diagram of a terminal according to an embodiment of this application.

Specifically, for a case that the decoder is a terminal, FIG. 5 is a schematic diagram of a hardware structure of a terminal for implementing an embodiment of this application.

The terminal 500 includes but is not limited to at least some components such as a radio frequency unit 501, a network module 502, an audio output unit 503, an input unit 504, a sensor 505, a display unit 506, a user input unit 507, an interface unit 508, a memory 509, and a processor 510.

A person skilled in the art may understand that the terminal 500 may further include a power supply (for example, a battery) supplying power to all components. The power supply may be logically connected to the processor 510 through a power management system. In this way, functions such as charge management, discharge management, and power consumption management are implemented by using the power management system. The terminal structure shown in FIG. 5 does not constitute a limitation on the terminal. The terminal may include more or fewer components than those shown in the figure, or some components are combined, or component arrangements are different. Details are not described herein again.

It should be understood that, in this embodiment of this application, the input unit 504 may include a graphics processing unit (GPU) 5041 and a microphone 5042. The graphics processing unit 5041 processes image data of a still picture or video obtained by an image capture apparatus (such as a camera) in a video capture mode or an image capture mode. The display unit 506 may include a display panel 5061, and the display panel 5061 may be configured in a form of a liquid crystal display, an organic light-emitting diode, or the like. The user input unit 507 includes at least one of a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a function button (such as a volume control button or a power button), a trackball, a mouse, and a joystick. Details are not described herein again.

In this embodiment of this application, after receiving downlink data from a network-side device, the radio frequency unit 501 may transmit the downlink data to the processor 510 for processing. In addition, the radio frequency unit 501 may send uplink data to the network-side device. Usually, the radio frequency unit 501 includes but is not limited to an antenna, an amplifier, a transceiver, a coupler, a low noise amplifier, a duplexer, and the like.

The memory 509 may be configured to store software programs or instructions and various data. The memory 509 may primarily include a first storage area for storing programs or instructions and a second storage area for storing data. The first storage area may store an operating system, an application program or instructions required by at least one function (such as an audio play function and an image play function), and the like. In addition, the memory 509 may include a volatile memory or a non-volatile memory, or the memory 509 may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). The memory 509 in this embodiment of this application includes but is not limited to these and any other suitable types of memories.

The processor 510 may include one or more processing units. Optionally, the processor 510 integrates an application processor and a modem processor. The application processor mainly processes operations related to the operating system, a user interface, an application program, and the like. The modem processor mainly processes a wireless communication signal. For example, the modem processor is a baseband processor. It may be understood that the modem processor may alternatively not be integrated in the processor 510.

The processor 510 is configured to determine, by a decoder, an encoding coefficient vector based on a received signal and an NSTBC codebook.

The processor 510 is configured to decode, by the decoder, original encoded input symbols in a current symbol period based on the encoding coefficient vector, a DSTBC encoding mode, and the NSTBC codebook.

In this embodiment of this application, on one hand, based on the received signal and a structure of the NSTBC codebook, a signal vector is constructed, and the encoding coefficient vector is calculated; and on the other hand, the original encoded input symbols in the current symbol period are calculated and restored based on the calculated encoding coefficient vector, the DSTBC encoding mode, and the NSTBC codebook. Based on this decoding mode, original symbols can be restored in absence of a pilot, and system overheads can be reduced. In addition, based on the NSTBC codebook, a quantity or types of load impedances on each antenna can be reduced, and a probability of error detection can be effectively reduced, while a diversity gain is ensured.

In a specific implementation, a codebook structure of the NSTBC codebook meets:

$$\begin{pmatrix} s_{2t+1} & s_{2t+2}^* \\ s_{2t+2} & -s_{2t+1}^* \end{pmatrix},$$

where $s_{2t+1}$ and $s_{2t+2}^*$ are original encoded input symbols decoded by the decoder in a $(2t+1)^{th}$ symbol period, $s_{2t+2}$ and $-s_{2t+1}^*$ are original encoded input symbols decoded by the decoder in a $(2t+2)^{th}$ symbol period, the symbol $s_{2t+2}^*$ is a conjugate of the symbol $s_{2t+2}$, the symbol $-s_{2t+1}^*$ is a negative conjugate of the symbol $s_{2t+1}$, the $(2t+1)^{th}$ symbol period is the current symbol period, and the $(2t+2)^{th}$ symbol period is a symbol period next to the current symbol period.

In a specific implementation, the processor 510 is specifically configured to:
 determine, by the decoder, a signal vector based on the received signal and the NSTBC codebook; and
 determine, by the decoder, an encoding coefficient vector of the decoder in the current symbol period based on the signal vector.

In a specific implementation, the processor 510 is specifically configured to:
 determine, by the decoder based on a formula $$(\tilde{A}(\mathcal{D}_{2t+1}), \tilde{B}(\mathcal{D}_{2t+1})) = \underset{(A(\mathcal{D}_{2t-1}), B(\mathcal{D}_{2t-1})) \in \mathcal{V}}{\arg\min} \|(A(\mathcal{D}_{2t+1}), B(\mathcal{D}_{2t+1})) - (\mathcal{R}_1, \mathcal{R}_2)\|^2,$$

an encoding coefficient vector $(\tilde{A}(\mathcal{D}_{2t+1}), \tilde{B}(\mathcal{D}_{2t+1}))$ of the decoder in a $(2t+1)^{th}$ symbol period, where
 $\mathcal{V}$ is an encoding coefficient vector set, $(\mathcal{R}_1, \mathcal{R}_2)$ is the signal vector, and $(\tilde{A}(\mathcal{D}_{2t+1}), \tilde{B}(\mathcal{D}_{2t+1}))$ is the encoding coefficient vector determined by the decoder in the $(2t+1)^{th}$ symbol period.

In a specific implementation, the processor 510 is specifically configured to:
 decode, by the decoder based on a formula $$(s_{2t+1}, s_{2t+2}^*) = \tilde{A}(\mathcal{D}_{2t+1})(s_{2t-1}, s_{2t}^*) + \tilde{B}(\mathcal{D}_{2t+1})(s_{2t}, -s_{2t-1}^*),$$

original encoded input symbols in the $(2t+1)^{th}$ symbol period, where
 $s_{2t-1}$ and $s_{2t}^*$ are original encoded input symbols decoded by the decoder in a $(2t-1)^{th}$ symbol period, and $s_{2t}$ and $-s_{2t-1}$ are original encoded input symbols decoded by the decoder in a $2t^{th}$ symbol period.

In a specific implementation, the processor 510 is configured to determine, by the decoder, original bits or original symbols based on a preset mapping table between the original bits or the original symbols and $(\tilde{A}(\mathcal{D}_{2t+1}), \tilde{B}(\mathcal{D}_{2t+1}))$, where the preset mapping table between the original bits or the original symbols and $(\tilde{A}(\mathcal{D}_{2t+1}), \tilde{B}(\mathcal{D}_{2t+1}))$ includes a mapping relationship between the original bits or the original symbols and the encoding coefficient vector $(\tilde{A}(\mathcal{D}_{2t+1}), \tilde{B}(\mathcal{D}_{t+1}))$ after initial reference symbols are determined.

In a specific implementation, the processor 510 is configured to determine, by the decoder, original symbols ($s_{2t+1}$, $s_{2t+2}$) based on the decoded original encoded input symbols ($s_{2t+1}$, $s_{2t+2}^*$); and
 determine, by the decoder, original bits based on ($s_{2t+1}$, $s_{2t+2}$).

In a specific implementation, the processor 510 is configured to determine, by the decoder, that original encoded input symbols in a first symbol period are ($s_1$, $s_2^*$) and that original encoded input symbols in a second symbol period are ($s_2$, $-s_1^*$), where
 the original encoded input symbols ($s_1$, $s_2^*$) are initial reference symbols; and
 the processor 510 is configured to decode, by the decoder based on a formula $$(s_3, s_4^*) = \tilde{A}(\mathcal{D}_3)(s_1, s_2^*) + \tilde{B}(\mathcal{D}_3)(s_2, -s_1^*),$$

original encoded input symbols in a third symbol period, where
 $(\tilde{A}(\mathcal{D}_3), \tilde{B}(\mathcal{D}_3))$ is an encoding coefficient vector obtained by the decoder in the third symbol period, and ($s_1$, $s_2^*$) and ($s_2$, $-s_1^*$) meet the following NSTBC codebook:

$$\begin{pmatrix} s_1 & s_2^* \\ s_2 & -s_1^* \end{pmatrix}.$$

In a specific implementation, the processor 510 is specifically configured to:
 determine, by the decoder based on formulas $$\mathcal{R}_1 = r_{2t+1}r_{2t-1}^* + r_{2t+2}^* r_{2t}, \text{ and}$$

$$\mathcal{R}_2 = r_{2t+1}r_{2t}^* - r_{2t+2}^* r_{2t-1},$$

the signal vector ($\mathcal{R}_1$, $\mathcal{R}_2$), where
 $r_{2t-1}$ is a signal received by the decoder in a $(2t-1)^{th}$ symbol period, $r_{2t}$ is a signal received by the decoder in a $2t^{th}$ symbol period, $r_{2t+1}$ is a signal received by the decoder in a $(2t+1)^{th}$ symbol period, and $r_{2t+2}$ is a signal received by the decoder in a $(2t+2)^{th}$ symbol period.

In a specific implementation, the signal vector ($\mathcal{R}_1$, $\mathcal{R}_2$) meets:

$$\mathcal{R}_1 = \mathcal{S}_1 + \mathcal{N}_1, \text{ and}$$

$$\mathcal{R}_2 = \mathcal{S}_2 + \mathcal{N}_2,$$

where ($\mathcal{S}_1$, $\mathcal{S}_2$) is a linear combination vector of wanted signals, and ($\mathcal{N}_1$, $\mathcal{N}_2$) is a noise interference vector.

In a specific implementation, ($\mathcal{S}_1$, $\mathcal{S}_2$) meets:

$$S_1 = (|\alpha_1|^2 + |\alpha_2|^2)(s_{2t+1}s_{2t-1}^* + s_{2t+2}s_{2t}^*) = (|\alpha_1|^2 + |\alpha_2|^2)A(\mathcal{D}_{2t+1}), \text{ and}$$

$$S_2 = (|\alpha_1|^2 + |\alpha_2|^2)(s_{2t+1}s_{2t}^* - s_{2t+2}^*s_{2t-1}) = (|\alpha_1|^2 + |\alpha_2|^2)B(\mathcal{D}_{2t+1}); \text{ and}$$

$(\mathcal{N}_1, \mathcal{N}_2)$ meets:

$$\mathcal{N}_1 = (s_{2t+1}, s_{2t+2}^*)\Lambda(\alpha_1, \alpha_2)N_{2t-1}^* + N_{2t+1}\Lambda^*(\alpha_1, \alpha_2)(s_{2t-1}^*, s_{2t}) + N_{2t+1}N_{2t-1}^*,$$

and $$\mathcal{N}_2 = (s_{2t+1}, s_{2t+2}^*)\Lambda(\alpha_1, \alpha_2)M_{2t}^* + N_{2t+1}\Lambda^*(\alpha_1, \alpha_2)(s_{2t}^*, -s_{2t-1}) + N_{2t+1}M_{2t}^*,$$

$$\text{where } \Lambda(\alpha_1, \alpha_2) = \begin{pmatrix} \alpha_1 & -\alpha_2^* \\ \alpha_2 & \alpha_1^* \end{pmatrix},$$

$$N_{2t-1} = (\eta_{2t-1}, \eta_{2t}^*),$$

$$N_{2t+1} = (\eta_{2t+1}, \eta_{2t+2}^*), \text{ and}$$

$$M_{2t} = (\eta_{2t}, -\eta_{2t-1}^*),$$

where $\alpha_1$ and $\alpha_2$ are respectively channel gains from two transmit antennas of an encoder after encoding to receive antennas of the decoder, $s_{2t-1}$ and $s_{2t}^*$ are original encoded input symbols decoded by the decoder in the $(2t-1)^{th}$ symbol period, $s_{2t}$ and $-s_{2t-1}^*$ are original encoded input symbols decoded by the decoder in the $2t^{th}$ symbol period, $s_{2t+1}$ and $s_{2t+2}^*$ are original encoded input symbols decoded by the decoder in the $(2t+1)^{th}$ symbol period, and $s_{2t+2}$ and $-s_{2t+1}^*$ are original encoded input symbols decoded by the decoder in the $(2t+2)^{th}$ symbol period;

$\Lambda(\alpha_1, \alpha_2)$ is a channel matrix;

$N_{2t-1}$, $N_{2t+1}$, and $M_{2t}$ are noise vectors; and $\eta_{2t-1}$ is noise received by the decoder in the $(2t-1)^{th}$ symbol period, $\eta_{2t}$ is noise received by the decoder in the $2t^{th}$ symbol period, $\eta_{2t+1}$ is noise received by the decoder in the $(2t+1)^{th}$ symbol period, and $\eta_{2t+2}$ is noise received by the decoder in the $(2t+2)^{th}$ symbol period.

Figure 6:
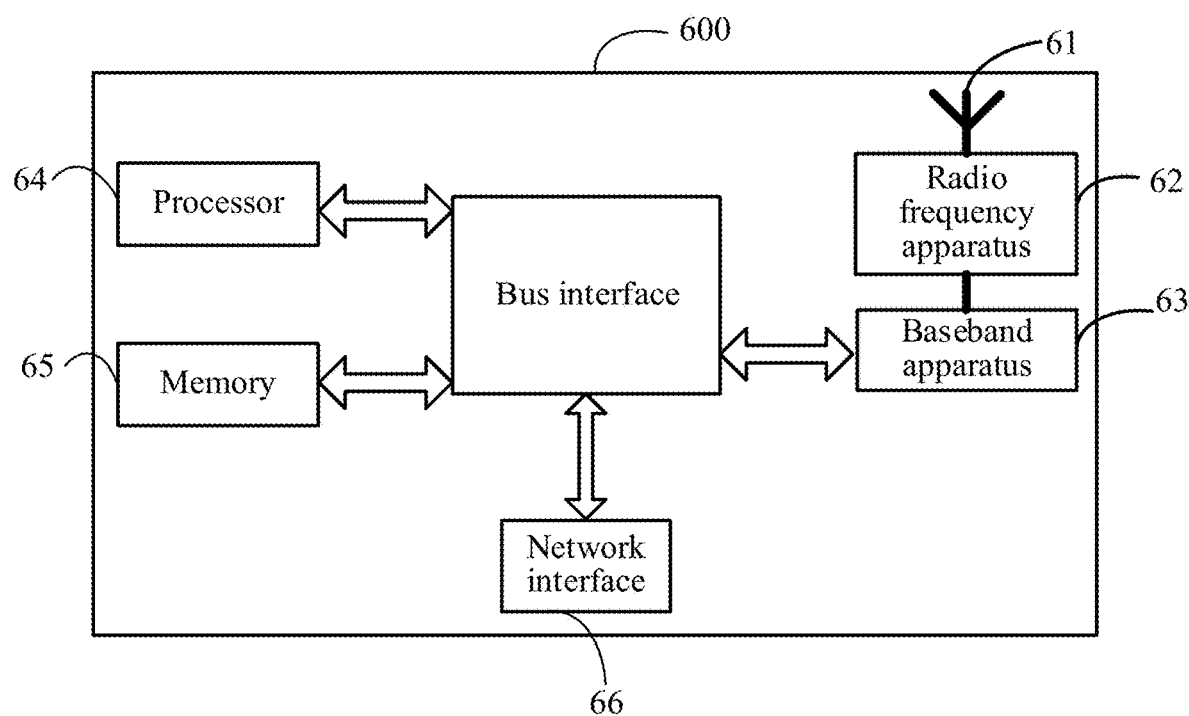
FIG. 6 is a schematic structural diagram of a network-side device according to an embodiment of this application.

Specifically, in a case that the decoder is a network-side device, as shown in FIG. 6, the network-side device 600 includes an antenna 61, a radio frequency apparatus 62, a baseband apparatus 63, a processor 64, and a memory 65. The antenna 61 is connected to the radio frequency apparatus 62. In an uplink direction, the radio frequency apparatus 62 receives information by using the antenna 61, and sends the received information to the baseband apparatus 63 for processing. In a downlink direction, the baseband apparatus 63 processes to-be-sent information, and sends the information to the radio frequency apparatus 62; and the radio frequency apparatus 62 processes the received information and then sends the information out by using the antenna 61.

The method in the foregoing method embodiment may be implemented in the baseband apparatus 63. The baseband apparatus 63 includes a baseband processor.

The baseband apparatus 63 may include, for example, at least one baseband unit, where a plurality of chips are disposed on the baseband unit. As shown in FIG. 6, one of the chips is, for example, the baseband processor, connected to the memory 65 by using a bus interface, to invoke a program in the memory 65 to perform the operation of the network-side device shown in the foregoing method embodiment.

The network-side device may further include a network interface 66, where the interface is, for example, a common public radio interface (CPRI).

Specifically, the network-side device 600 in this embodiment of the present invention further includes a program or instructions stored in the memory 65 and capable of running on the processor 64. When the processor 64 invokes the program or instructions in the memory 65, the method performed by each module shown in FIG. 3 is performed, with the same technical effect achieved. To avoid repetition, details are not described herein again.

An embodiment of this application further provides a readable storage medium. The readable storage medium stores a program or instructions. When the program or instructions are executed by a processor, each process of the foregoing embodiment of the decoding method is implemented, with the same technical effect achieved. To avoid repetition, details are not described herein again.

The processor is a processor in the terminal in the foregoing embodiment. The readable storage medium includes a computer-readable storage medium, such as a computer read-only memory ROM, a random access memory RAM, a magnetic disk, or an optical disc.

In addition, an embodiment of this application provides a chip. The chip includes a processor and a communication interface. The communication interface is coupled to the processor. The processor is configured to run a program or instructions to implement each process of the foregoing embodiment of the decoding method, with the same technical effect achieved. To avoid repetition, details are not described herein again. It should be understood that the chip provided in this embodiment of this application may also be referred to as a system-level chip, a system chip, a chip system, a system-on-chip, or the like.

In addition, an embodiment of this application provides a computer program product. The computer program product is stored in a storage medium. The computer program product is executed by at least one processor to implement each process of the foregoing embodiment of the decoding method, with the same technical effect achieved. To avoid repetition, details are not described herein again.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A decoding method, comprising:
   determining, by a decoder, an encoding coefficient vector based on a received signal and a new space time block code (NSTBC) codebook; and
   decoding, by the decoder, original encoded input symbols in a current symbol period based on the encoding coefficient vector, a differential space time block code (DSTBC) encoding mode, and the NSTBC codebook.

2. The method according to claim 1, wherein a codebook structure of the NSTBC codebook meets:

$$\begin{pmatrix} s_{2t+1} & s_{2t+2}^* \\ s_{2t+2} & -s_{2t+1}^* \end{pmatrix},$$

wherein $s_{2t+1}$ and $s_{2t+2}^*$ are original encoded input symbols decoded by the decoder in a $(2t+1)^{th}$ symbol period, $s_{2t+2}$ and $-s_{2t+1}^*$ are original encoded input symbols decoded by the decoder in a $(2t+2)^{th}$ symbol period, the symbol $s_{2t+2}^*$ is a conjugate of the symbol $s_{2t+2}$, the symbol $-s_{2t+1}^*$ is a negative conjugate of the symbol $s_{2t+1}$, the $(2t+1)^{th}$ symbol period is the current symbol period, and the $(2t+2)^{th}$ symbol period is a symbol period next to the current symbol period.

3. The method according to claim 1, wherein the determining, by a decoder, an encoding coefficient vector based on a received signal and a new space time block code (NSTBC) codebook comprises:
   determining, by the decoder, a signal vector based on the received signal and the NSTBC codebook; and
   determining, by the decoder, an encoding coefficient vector of the decoder in the current symbol period based on the signal vector.

4. The method according to claim 3, wherein the determining, by the decoder, an encoding coefficient vector of the decoder in the current symbol period based on the signal vector comprises:
   determining, by the decoder based on a formula $$(\tilde{A}(\mathcal{D}_{2t+1}), \tilde{B}(\mathcal{D}_{2t+1})) = \underset{(A(\mathcal{D}_{2t-1}), B(\mathcal{D}_{2t-1})) \in \mathcal{V}}{\operatorname{argmin}} \|(A(\mathcal{D}_{2t+1}), B(\mathcal{D}_{2t+1})) - (\mathcal{R}_1, \mathcal{R}_2)\|^2,$$

an encoding coefficient vector $(\tilde{A}(\mathcal{D}_{2t+1}), \tilde{B}(\mathcal{D}_{2t+1}))$ of the decoder in a $(2t+1)^{th}$ symbol period, wherein
   $\mathcal{V}$ is an encoding coefficient vector set, $(\mathcal{R}_1, \mathcal{R}_2)$ is the signal vector, and $(\tilde{A}(\mathcal{D}_{2t+1}), \tilde{B}(\mathcal{D}_{2t+1}))$ is the encoding coefficient vector determined by the decoder in the $(2t+1)^{th}$ symbol period.

5. The method according to claim 4, wherein the decoding, by the decoder, original encoded input symbols in a current symbol period based on the encoding coefficient vector, a DSTBC encoding mode, and the NSTBC codebook comprises:
   decoding, by the decoder based on a formula $$(s_{2t+1}, s_{2t+2}^*) = \tilde{A}(\mathcal{D}_{2t+1})(s_{2t-1}, s_{2t}^*) + \tilde{B}(\mathcal{D}_{2t+1})(s_{2t}, -s_{2t-1}^*),$$

original encoded input symbols in the $(2t+1)^{th}$ symbol period, wherein
   $s_{2t-1}$ and $s_{2t}^*$ are original encoded input symbols decoded by the decoder in a $(2t-1)^{th}$ symbol period, and $s_{2t}$ and $-s_{2t-1}^*$ are original encoded input symbols decoded by the decoder in a $2t^{th}$ symbol period.

6. The method according to claim 4, wherein the method further comprises:
   determining, by the decoder, original bits or original symbols based on a preset mapping table between the original bits or the original symbols and $(\tilde{A}(\mathcal{D}_{2t+1}), \tilde{B}(\mathcal{D}_{2t+1}))$, wherein
   the preset mapping table comprises a mapping relationship between the original bits or the original symbols and the encoding coefficient vector $(\tilde{A}(\mathcal{D}_{2t+1}), \tilde{B}(\mathcal{D}_{2t+1}))$ after initial reference symbols are determined.

7. The method according to claim 5, wherein the method further comprises:
   determining, by the decoder, original symbols $(s_{2t+1}, s_{2t+2})$ based on the decoded original encoded input symbols $(s_{2t+1}, s_{2t+2}^*)$; and
   determining, by the decoder, original bits based on $(s_{2t+1}, s_{2t+2})$.

8. The method according to claim 1, wherein the method further comprises:
   determining, by the decoder, that original encoded input symbols in a first symbol period are $(s_1, s_2^*)$ and that original encoded input symbols in a second symbol period are $(s_2, -s_1^*)$ wherein
   the original encoded input symbols $(s_1, s_2^*)$ are initial reference symbols; and
   decoding, by the decoder based on a formula $$(s_3, s_4^*) = \tilde{A}(\mathcal{D}_3)(s_1, s_2^*) + \tilde{B}(\mathcal{D}_3)(s_2, -s_1^*).$$

original encoded input symbols in a third symbol period, wherein
   $(\tilde{A}(\mathcal{D}_3), \tilde{B}(\mathcal{D}_3))$ is an encoding coefficient vector obtained by the decoder in the third symbol period, and $(s_1, s_2^*)$ and $(s_2, -s_1^*)$ meet the following NSTBC codebook:

$$\begin{pmatrix} s_1 & s_2^* \\ s_2 & -s_1^* \end{pmatrix}.$$

9. The method according to claim 3, wherein the determining, by the decoder, a signal vector based on the received signal and the NSTBC codebook comprises:
determining, by the decoder based on formulas $$\mathcal{R}_1 = r_{2t+1} r_{2t-1}^* + r_{2t+2}^* r_{2t},$$

and $$\mathcal{R}_2 = r_{2t+1} r_{2t}^* - r_{2t+2}^* r_{2t-1},$$

the signal vector ($\mathcal{R}_1$, $\mathcal{R}_2$), wherein $r_{2t-1}$ is a signal received by the decoder in a $(2t-1)^{th}$ symbol period, $r_{2t}$ is a signal received by the decoder in a $2t^{th}$ symbol period, $r_{2t+1}$ is a signal received by the decoder in a $(2t+1)^{th}$ symbol period, and $r_{2t+2}$ is a signal received by the decoder in a $(2t+2)^{th}$ symbol period.

10. The method according to claim 9, wherein the signal vector ($\mathcal{R}_1$, $\mathcal{R}_2$) meets:

$$\mathcal{R}_1 = \mathcal{S}_1 + \mathcal{N}_1,$$

and $$\mathcal{R}_2 = \mathcal{S}_2 + \mathcal{N}_2,$$

wherein ($\mathcal{S}_1$, $\mathcal{S}_2$) is a linear combination vector of wanted signals, and ($\mathcal{N}_1$, $\mathcal{N}_2$) is a noise interference vector.

11. The method according to claim 10, wherein ($\mathcal{S}_1$, $\mathcal{S}_2$) meets:

$$\mathcal{S}_1 = (|\alpha_1|^2 + |\alpha_2|^2)(s_{2t+1} s_{2t-1}^* + s_{2t+2} s_{2t}^*) = (|\alpha_1|^2 + |\alpha_2|^2) A(\mathcal{D}_{2t+1}),$$

and $$\mathcal{S}_2 = (|\alpha_1|^2 + |\alpha_2|^2)(s_{2t+1} s_{2t}^* - s_{2t+2}^* s_{2t-1}) = (|\alpha_1|^2 + |\alpha_2|^2) B(\mathcal{D}_{2t+1});$$

and ($\mathcal{N}_1$, $\mathcal{N}_1$) meets:

$$\mathcal{N}_1 = (s_{2t+1}, s_{2t+2}^*) \Lambda(\alpha_1, \alpha_2) N_{2t-1}^* + N_{2t+1} \Lambda^*(\alpha_1, \alpha_2)(s_{2t-1}^*, s_{2t}) + N_{2t+1} N_{2t-1}^*,$$

and $$\mathcal{N}_2 = (s_{2t+1}, s_{2t+2}^*) \Lambda(\alpha_1, \alpha_2) M_{2t}^* + N_{2t+1} \Lambda^*(\alpha_1, \alpha_2)(s_{2t}^*, -s_{2t-1}) + N_{2t+1} M_{2t}^*,$$

wherein $$\Lambda(\alpha_1, \alpha_2) = \begin{pmatrix} \alpha_1 & -\alpha_2^* \\ \alpha_2 & \alpha_1^* \end{pmatrix},$$

$$N_{2t-1} = (\eta_{2t-1}, \eta_{2t}^*),$$

$$N_{2t+1} = (\eta_{2t+1}, \eta_{2t+2}^*),$$

and $$M_{2t} = (\eta_{2t}, -\eta_{2t-1}^*),$$

wherein $\alpha_1$ and $\alpha_2$ are respectively channel gains from two transmit antennas of an encoder after encoding to receive antennas of the decoder, $s_{2t-1}$ and $s_{2t}^*$ are original encoded input symbols decoded by the decoder in the $(2t-1)^{th}$ symbol period, $s_{2t}$ and $-s_{2t-1}^*$ are original encoded input symbols decoded by the decoder in the $2t^{th}$ symbol period, $s_{2t+1}$ and $s_{2t+2}^*$ are original encoded input symbols decoded by the decoder in the $(2t+1)^{th}$ symbol period, and $s_{2t+2}$ and $-s_{2t+1}^*$ are original encoded input symbols decoded by the decoder in the $(2t+2)^{th}$ symbol period;

$\Lambda(\alpha_1, \alpha_2)$ is a channel matrix;

$N_{2t-1}$, $N_{2t+1}$, and $M_{2t}$ are noise vectors; and $\eta_{2t-1}$ is noise received by the decoder in the $(2t-1)^{th}$ symbol period, $\eta_{2t}$ is noise received by the decoder in the $2t^{th}$ symbol period, $\eta_{2t+1}$ is noise received by the decoder in the $(2t+1)^{th}$ symbol period, and $\eta_{2t+2}$ is noise received by the decoder in the $(2t+2)^{th}$ symbol period.

12. A decoder, comprising a processor and a memory, wherein the memory stores a program or instructions capable of running on the processor, wherein the program or instructions, when executed by the processor, causes the decoder to perform:
determining an encoding coefficient vector based on a received signal and a new space time block code (NSTBC) codebook; and
decoding original encoded input symbols in a current symbol period based on the encoding coefficient vector, a differential space time block code (DSTBC) encoding mode, and the NSTBC codebook.

13. The decoder according to claim 12, wherein a codebook structure of the NSTBC codebook meets:

$$\begin{pmatrix} s_{2t+1} & s_{2t+2}^* \\ s_{2t+2} & -s_{2t+1}^* \end{pmatrix},$$

wherein $s_{2t+1}$ and $s_{2t+2}^*$ are original encoded input symbols decoded by the decoder in a $(2t+1)^{th}$ symbol period, $s_{2t+2}$ and $-s_{2t+1}^*$ are original encoded input symbols decoded by the decoder in a $(2t+2)^{th}$ symbol period, the symbol $s_{2t+2}^*$ is a conjugate of the symbol $s_{2t+2}$, the symbol $-s_{2t+1}^*$ is a negative conjugate of the symbol $s_{2t+1}$, the $(2t+1)^{th}$ symbol period is the current symbol period, and the $(2t+2)^{th}$ symbol period is a symbol period next to the current symbol period.

14. The decoder according to claim 12, wherein when determining an encoding coefficient vector based on a received signal and a new space time block code (NSTBC) codebook, the program or instructions, when executed by the processor, causes the decoder to perform:
determining a signal vector based on the received signal and the NSTBC codebook; and
determining an encoding coefficient vector of the decoder in the current symbol period based on the signal vector.

15. The decoder according to claim 14, wherein when determining an encoding coefficient vector of the decoder in the current symbol period based on the signal vector, the program or instructions, when executed by the processor, causes the decoder to perform:
determining, based on a formula $$(\tilde{A}(\mathcal{D}_{2t+1}),$$

$$\tilde{B}(\mathcal{D}_{2t+1})) = \underset{(A(\mathcal{D}_{2t-1}), B(\mathcal{D}_{2t-1})) \in \mathcal{V}}{\operatorname{argmin}} \|(A(\mathcal{D}_{2t+1}), B(\mathcal{D}_{2t+1})) - (\mathcal{R}_1, \mathcal{R}_2)\|^2,$$

an encoding coefficient vector ($\tilde{A}(\mathcal{D}_{2t+1})$, $\tilde{B}(\mathcal{D}_{2t+1})$) of the decoder in a $(2t+1)^{th}$ symbol period, wherein $\mathcal{V}$ is an encoding coefficient vector set, ($\mathcal{R}_1$, $\mathcal{R}_2$) is the signal vector, and ($\tilde{A}(\mathcal{D}_{2t+1})$, $\tilde{B}(\mathcal{D}_{2t+1})$) is the encoding coefficient vector determined by the decoder in the $(2t+1)^{th}$ symbol period.

16. The decoder according to claim 15, wherein when decoding original encoded input symbols in a current symbol period based on the encoding coefficient vector, a DSTBC encoding mode, and the NSTBC codebook, the program or instructions, when executed by the processor, causes the decoder to perform:

decoding, based on a formula $$(s_{2t+1}, s_{2t+2}^*) = \tilde{A}(\mathcal{D}_{2t+1})(s_{2t-1}, s_{2t}^*) + \tilde{B}(\mathcal{D}_{2t+1})(s_{2t}, -s_{2t-1}^*),$$

original encoded input symbols in the $(2t+1)^{th}$ symbol period, wherein $s_{2t-1}$ and $s_{2t}^*$ are original encoded input symbols decoded by the decoder in a $(2t-1)^{th}$ symbol period, and $s_{2t}$ and $-s_{2t-1}^*$ are original encoded input symbols decoded by the decoder in a $2t^{th}$ symbol period;

wherein the program or instructions, when executed by the processor, causes the decoder to further perform:

determining original symbols $(s_{2t+1}, s_{2t+2})$ based on the decoded original encoded input symbols $(s_{2t+1}, s_{2t+2})$; and determining original bits based on $(s_{2t+1}, s_{2t+2})$.

17. The decoder according to claim 15, wherein the program or instructions, when executed by the processor, causes the decoder to further perform:

determining original bits or original symbols based on a preset mapping table between the original bits or the original symbols and $(\tilde{A}(\mathcal{D}_{2t+1}), \tilde{B}(\mathcal{D}_{2t+1}))$, wherein the preset mapping table comprises a mapping relationship between the original bits or the original symbols and the encoding coefficient vector $(\tilde{A}(\mathcal{D}_{2t+1}), \tilde{B}(\mathcal{D}_{2t+1}))$ after initial reference symbols are determined.

18. The decoder according to claim 12, wherein the program or instructions, when executed by the processor, causes the decoder to further perform:

determining that original encoded input symbols in a first symbol period are $(s_1, s_2^*)$ and that original encoded input symbols in a second symbol period are $(s_2, -s_1^*)$, wherein the original encoded input symbols $(s_1, s_2^*)$ are initial reference symbols; and decoding, based on a formula $$(s_3, s_4^*) = \tilde{A}(\mathcal{D}_3)(s_1, s_2^*) + \tilde{B}(\mathcal{D}_3)(s_2, -s_1^*),$$

original encoded input symbols in a third symbol period, wherein $(\tilde{A}(\mathcal{D}_3), \tilde{B}(\mathcal{D}_3))$ is an encoding coefficient vector obtained by the decoder in the third symbol period, and $(s_1, s_2^*)$ and $(s_2, -s_1^*)$ meet the following NSTBC codebook:

$$\begin{pmatrix} s_1 & s_2^* \\ s_2 & -s_1^* \end{pmatrix}.$$

19. The decoder according to claim 14, wherein when determining a signal vector based on the received signal and the NSTBC codebook, the program or instructions, when executed by the processor, causes the decoder to perform:

determining, based on formulas $$\mathcal{R}_1 = r_{2t+1} r_{2t-1}^* + r_{2t+2}^* r_{2t},$$

and $$\mathcal{R}_2 = r_{2t+1} r_{2t}^* - r_{2t+2}^* r_{2t-1},$$

the signal vector $(\mathcal{R}_1, \mathcal{R}_2)$, wherein $r_{2t-1}$ is a signal received by the decoder in a $(2t-1)^{th}$ symbol period, $r_{2t}$ is a signal received by the decoder in a $2t^{th}$ symbol period, $r_{2t+1}$ is a signal received by the decoder in a $(2t+1)^{th}$ symbol period, and $r_{2t+2}$ is a signal received by the decoder in a $(2t+2)^{th}$ symbol period;

wherein the signal vector $(\mathcal{R}_1, \mathcal{R}_2)$ meets:

$$\mathcal{R}_1 = \mathcal{S}_1 + \mathcal{N}_1,$$

and $$\mathcal{R}_2 = \mathcal{S}_2 + \mathcal{N}_2,$$

wherein $(\mathcal{S}_1, \mathcal{S}_2)$ is a linear combination vector of wanted signals, and $(\mathcal{N}_1, \mathcal{N}_2)$ is a noise interference vector;

wherein $(\mathcal{S}_1, \mathcal{S}_2)$ meets:

$$\mathcal{S}_1 = (|\alpha_1|^2 + |\alpha_2|^2)(s_{2t+1} s_{2t-1}^* + s_{2t+2} s_{2t}^*) = (|\alpha_1|^2 + |\alpha_2|^2) A(\mathcal{D}_{2t+1}),$$

and $$\mathcal{S}_2 = (|\alpha_1|^2 + |\alpha_2|^2)(s_{2t+1} s_{2t}^* - s_{2t+2} s_{2t-1}^*) = (|\alpha_1|^2 + |\alpha_2|^2) B(\mathcal{D}_{2t+1});$$

and $(\mathcal{N}_1, \mathcal{N}_1)$ meets:

$$\mathcal{N}_1 = (s_{2t+1}, s_{2t+2}^*) \Lambda(\alpha_1, \alpha_2) N_{2t-1}^* + N_{2t+1} \Lambda^*(\alpha_1, \alpha_2)(s_{2t-1}^*, s_{2t}) + N_{2t+1} N_{2t-1}^*,$$

and $$\mathcal{N}_2 = (s_{2t+1}, s_{2t+2}^*) \Lambda(\alpha_1, \alpha_2) M_{2t}^* + N_{2t+1} \Lambda^*(\alpha_1, \alpha_2)(s_{2t}^*, -s_{2t-1}) + N_{2t+1} M_{2t}^*,$$

wherein $$\Lambda(\alpha_1, \alpha_2) = \begin{pmatrix} \alpha_1 & -\alpha_2^* \\ \alpha_2 & \alpha_1^* \end{pmatrix},$$

$$N_{2t-1} = (\eta_{2t-1}, \eta_{2t}^*),$$

$$N_{2t+1} = (\eta_{2t+1}, \eta_{2t+2}^*),$$

and $$M_{2t} = (\eta_{2t}, -\eta_{2t-1}^*),$$

wherein $\alpha_1$ and $\alpha_2$ are respectively channel gains from two transmit antennas of an encoder after encoding to receive antennas of the decoder, $s_{2t-1}$ and $s_{2t}^*$ are original encoded input symbols decoded by the decoder in the $(2t-1)^{th}$ symbol period, $s_{2t}$ and $-s_{2t-1}^*$ are original encoded input symbols decoded by the decoder in the $2t^{th}$ symbol period, $s_{2t+1}$ and $s_{2t+2}^*$ are original encoded input symbols decoded by the decoder in the $(2t+1)^{th}$ symbol period, and $s_{2t+2}$ and $-s_{2t+1}^*$ are original encoded input symbols decoded by the decoder in the $(2t+2)^{th}$ symbol period;

$\Lambda(\alpha_1, \alpha_2)$ is a channel matrix;

$N_{2t-1}$, $N_{2t+1}$, and $M_{2t}$ are noise vectors; and $\eta_{2t-1}$ is noise received by the decoder in the $(2t-1)^{th}$ symbol period, $\eta_{2t}$ is noise received by the decoder in the $2t^{th}$ symbol period, $\eta_{2t+1}$ is noise received by the decoder in the $(2t+1)^{th}$ symbol period, and $\eta_{2t+2}$ is noise received by the decoder in the $(2t+2)^{th}$ symbol period.

20. A non-transitory readable storage medium, wherein the readable storage medium stores a program or instructions, wherein the program or instructions, when executed by a processor of a decoder, causes the decoder to perform:

determining an encoding coefficient vector based on a received signal and a new space time block code (NSTBC) codebook; and decoding original encoded input symbols in a current symbol period based on the encoding coefficient vector, a differential space time block code (DSTBC) encoding mode, and the NSTBC codebook.

\* \* \* \* \*